United States Patent
Hu et al.

(10) Patent No.: US 11,930,008 B2
(45) Date of Patent: Mar. 12, 2024

(54) SUBSCRIPTION INFORMATION CONFIGURATION METHOD AND COMMUNICATIONS DEVICE

(71) Applicant: HUAWEI TECHNOLOGIES CO., LTD., Guangdong (CN)

(72) Inventors: Li Hu, Shanghai (CN); Weisheng Jin, Shanghai (CN); Jing Chen, Shanghai (CN); He Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 524 days.

(21) Appl. No.: 17/148,234

(22) Filed: Jan. 13, 2021

(65) Prior Publication Data

US 2021/0136070 A1 May 6, 2021

Related U.S. Application Data

(63) Continuation of application No. PCT/CN2019/096039, filed on Jul. 15, 2019.

(30) Foreign Application Priority Data

Aug. 6, 2018 (CN) .......................... 201810888036.6

(51) Int. Cl.
*G06F 7/04* (2006.01)
*G06F 7/58* (2006.01)
*H04L 9/40* (2022.01)

(52) U.S. Cl.
CPC .......... *H04L 63/0876* (2013.01); *G06F 7/588* (2013.01); *H04L 63/126* (2013.01)

(58) Field of Classification Search
CPC ..... G06F 21/35; G06F 21/44; H04L 63/0876; H04L 63/062; H04L 9/08; H04L 9/32;
(Continued)

(56) References Cited

U.S. PATENT DOCUMENTS 9,426,654 B2 *  8/2016  Lee ..................... H04L 63/0853
9,591,485 B2 *  3/2017  Chang ..................... H04W 4/12
(Continued)

FOREIGN PATENT DOCUMENTS

CN     1620166 A     5/2005
CN     1767430 A     5/2006
(Continued)

OTHER PUBLICATIONS

Fu et al, Lightweight Efficient and Feasible IP Multimedia Subsystem Authentication, IEEE, Jun. 12, 2010, pp. 1-6. (Year: 2010).*

(Continued)

*Primary Examiner* — Philip J Chea
*Assistant Examiner* — Jenise E Jackson
(74) *Attorney, Agent, or Firm* — Fish & Richardson P.C.

(57) ABSTRACT

Example subscription information configuration methods and a communications device are described. One example method includes receiving a first device identifier by a network device from a first terminal device in a first access mode and receiving a second device identifier from a second terminal device in a second access mode. The network device determines whether the first device identifier matches the second device identifier to identify legality of the first terminal device. If the first device identifier matches the second device identifier, it indicates that the first terminal device is a legal terminal device. The network device sends subscription information of the first terminal device to the first terminal device in the first access mode, so that the first terminal device successfully accesses a network by using the subscription information.

12 Claims, 15 Drawing Sheets

(58) Field of Classification Search
CPC .. H04L 9/3213; H04W 12/041; H04W 12/06; H04W 12/71; H04W 12/72
See application file for complete search history.

(56) References Cited

U.S. PATENT DOCUMENTS

| | | | |
|---|---|---|---|
| 2005/0169219 A1* | 8/2005 | Serpa | H04L 61/5038 370/338 |
| 2012/0167162 A1 | 6/2012 | Raleigh et al. | |
| 2014/0109213 A1 | 4/2014 | Zhou et al. | |
| 2014/0258724 A1* | 9/2014 | Lambert | H04L 63/062 713/168 |
| 2014/0373040 A1 | 12/2014 | Lin et al. | |
| 2017/0208062 A1* | 7/2017 | Morikawa | H04L 9/0877 |
| 2017/0231011 A1 | 8/2017 | Park et al. | |
| 2017/0339245 A1 | 11/2017 | Pacella et al. | |
| 2017/0374706 A1 | 12/2017 | Sharma et al. | |
| 2019/0075601 A1* | 3/2019 | Cho | H04W 74/085 |
| 2019/0223012 A1* | 7/2019 | Yu | H04L 63/102 |
| 2019/0349765 A1* | 11/2019 | Kolekar | H04W 12/068 |

FOREIGN PATENT DOCUMENTS

| | | |
|---|---|---|
| CN | 101127064 A | 2/2008 |
| CN | 105577609 A | 5/2016 |
| CN | 106534072 A | 3/2017 |
| EP | 2713546 A1 | 4/2014 |
| WO | 03084265 A1 | 10/2003 |

OTHER PUBLICATIONS

Veltri et al, Wireless LAN-3G Integration: Unified Mechanisms for Secure Authentication Based on SIP, IEEE, Jun. 15, 2006, pp. 2219-2224. (Year: 2006).*

Office Action in Indian Appln. No. 202147001070, dated Feb. 28, 2023, 7 pages (with English translation).

PCT International Search Report and Written Opinion issued in International Application No. PCT/CN2019/096039 dated Aug. 27, 2019, 15 pages (with English translation).

Extended European Search Report in European Application No. 19848121.0, dated Jul. 29, 2021, 7 pages.

Office Action issued in Chinese Application No. 201810888036.6 dated Mar. 2, 2021, 15 pages.

* cited by examiner

SUBSCRIPTION INFORMATION CONFIGURATION METHOD AND COMMUNICATIONS DEVICE

CROSS-REFERENCE TO RELATED APPLICATIONS

This application is a continuation of International Application No. PCT/CN2019/096039, filed on Jul. 15, 2019, which claims priority to Chinese Patent Application No. 201810888036.6, filed on Aug. 6, 2018. The disclosures of the aforementioned applications are hereby incorporated by reference in their entireties.

TECHNICAL FIELD

The present disclosure relates to the field of communications technologies, and in particular, to a subscription information configuration method and a communications device.

BACKGROUND

An enterprise usually builds a private network by using a 3rd generation partnership project (3GPP) technology. Under coverage of the private network, the enterprise uses an internet of things (IoT) device to serve production of the enterprise.

To enable the IoT device, an account of the IoT device needs to be opened. The account opening means that a network side configures subscription information (or referred to as a credential) for the device. After the credential is successfully configured, the device can access a network by using the credential (for example, a subscriber identity module (SIM) card). In an existing online account opening technology, a user actively requests a server of a carrier to configure subscription information. This manner lacks verification on a terminal device, the request is mainly initiated by the user, and a network side may configure subscription information for any device. However, for a private network, when an enterprise deploys the private network, the enterprise does not expect a device other than a specific IoT device to access the private network. Therefore, an account opening process in the prior art is not applicable to the private network. How to design a method that can be used to verify a legal identity of a terminal device, to avoid configuring subscription information for an unauthorized device (or referred to as an illegal device) is a technical problem that needs to be urgently resolved currently.

SUMMARY

Embodiments of the present invention provide a subscription information configuration method and a communications device, to verify a legal identity of a terminal device, thereby avoiding configuring subscription information for an unauthorized device.

According to a first aspect, an embodiment of the present invention provides a subscription information configuration method, used on a network device side. The method includes: receiving, by a network device, a first device identifier sent by a first terminal device in a first access mode; receiving, by the network device, a second device identifier sent by a second terminal device in a second access mode; determining, by the network device, whether the first device identifier matches the second device identifier; and if the first device identifier matches the second device identifier, sending, by the network device, subscription information of the first terminal device to the first terminal device in the first access mode.

During implementation of this embodiment of the present invention, the network device verifies identity legality of the first terminal device based on the device identifier, so that the network device can be prevented from configuring subscription information for an unauthorized device, thereby improving security of a private network.

In a possible design, before the sending, by the network device, subscription information of the first terminal device to the first terminal device in the first access mode, the method further includes: receiving, by the network device, a first random number sent by the first terminal device; and sending, by the network device, first verification information to the first terminal device, where the first verification information is generated based on the first random number and a first key; and the sending, by the network device, subscription information of the first terminal device to the first terminal device in the first access mode includes: if the first device identifier matches the second device identifier, and the network device receives first acknowledgment information from the first terminal device, sending, by the network device, the subscription information of the first terminal device to the first terminal device in the first access mode, where the first acknowledgment information is used to indicate that the terminal device successfully verifies the first verification information.

During implementation of this embodiment of the present invention, the network device verifies the identity legality of the first terminal device based on the device identifier, and the first terminal device may verify a network side based on the verification information replied by the network device, so that the network device can be prevented from configuring subscription information for an unauthorized device; in addition, the first terminal device may further perform security authentication on the network side, thereby preventing the terminal device from accessing an illegal network, and improving the security of the private network.

In a possible design, before the sending, by the network device, subscription information of the first terminal device to the first terminal device in the first access mode, the method further includes: sending, by the network device, a second random number to the first terminal device; receiving, by the network device, second verification information sent by the first terminal device, where the second verification information is generated by the first terminal device based on the second random number and a second key; and determining, by the network device, whether the second verification information matches third verification information, where the third verification information is generated by the network device based on the second random number and the first key; and the sending, by the network device, subscription information of the first terminal device to the first terminal device in the first access mode includes: if the first device identifier matches the second device identifier, the second verification information matches the third verification information, and the network device receives the first acknowledgment information from the first terminal device sending, by the network device, the subscription information of the first terminal device to the first terminal device in the first access mode.

During implementation of this embodiment of the present invention, the network device verifies the identity legality of the first terminal device based on the device identifier, so that the network device can be prevented from configuring subscription information for an unauthorized device; in addition, a process in which the terminal device verifies the network side is added, thereby preventing the terminal device from accessing an illegal network, and improving the security of the private network.

In a possible design, before the sending, by the network device, subscription information of the first terminal device to the first terminal device in the first access mode, the method further includes: sending, by the network device, a second random number to the first terminal device; receiving, by the network device, second verification information sent by the first terminal device, where the second verification information is generated by the first terminal device based on the second random number and a second key, and determining, by the network device, whether the second verification information matches third verification information, where the third verification information is generated by the network device based on the second random number and a first key; and the sending, by the network device, subscription information of the first terminal device to the first terminal device in the first access mode includes: if the first device identifier matches the second device identifier, and the second verification information matches the third verification information, sending, by the network device, the subscription information of the first terminal device to the first terminal device in the first access mode.

During implementation of this embodiment of the present invention, the network device verifies the identity legality of the first terminal device based on the device identifier, so that the network device can be prevented from configuring subscription information for an unauthorized device; in addition, a process in which the terminal device verifies a network side is added, thereby preventing the terminal device from accessing an illegal network, and improving the security of the private network.

In a possible design, before the sending, by the network device, subscription information of the first terminal device to the first terminal device in the first access mode, the method further includes: receiving, by the network device, the first key sent by the second terminal device in the second access mode.

In a possible design, after the receiving, by a network device, a first device identifier sent by a first terminal device in a first access mode, and before the sending, by the network device, subscription information of the first terminal device to the first terminal device in the first access mode, the method further includes: sending, by the network device, a first token to the first terminal device, where the first token is obtained by the network device from the second terminal device; and the sending, by the network device, subscription information of the first terminal device to the first terminal device in the first access mode includes: if the first device identifier matches the second device identifier, and the network device receives second acknowledgment information from the first terminal device, sending, by the network device, the subscription information of the first terminal device to the first terminal device in the first access mode, where the second acknowledgment information is used to indicate that the first terminal device successfully verifies the first token.

During implementation of this embodiment of the present invention, the network device verifies the identity legality of the first terminal device based on the device identifier, and the first terminal device may verify a network side based on the token information replied by the network device, so that the network device can be prevented from configuring subscription information for an unauthorized device, and the terminal device is prevented from accessing an illegal network, thereby improving the security of the private network.

In a possible design, the receiving, by a network device, a first device identifier sent by a first terminal device in a first access mode includes: receiving, by the network device, a first non-access stratum message sent by the first terminal device in the first access mode, where the first non-access stratum message carries the first device identifier; and the sending, by the network device, subscription information of the first terminal device to the first terminal device includes: sending, by the network device, a second non-access stratum message to the first terminal device, where the second non-access stratum message carries the subscription information of the first terminal device.

In a possible design, the first device identifier includes an international mobile equipment identity (IMEI) and/or a permanent equipment identity (PEI), and the second device identifier includes an IMEI and/or a PEI.

In a possible design, the first access mode is a public network and the second access mode is a private network, or both the first access mode and the second access mode are public networks. The public network may include a wireless access mode in which access is performed by using a licensed spectrum. The private network may include a wireless access mode in which access is performed by using an unlicensed spectrum.

According to a second aspect, an embodiment of the present invention provides a subscription information configuration method, used on a first terminal device side. The method includes: sending, by a first terminal device, a first device identifier to a network device in a first access mode; and receiving, by the first terminal device, subscription information that is of the first terminal device and that is sent by the network device in the first access mode, where the subscription information is sent by the network device after the network device determines that the first device identifier matches a second device identifier, and the second device identifier is sent by a second terminal device to the network device in a second access mode.

During implementation of this embodiment of the present invention, the network device verifies identity legality of the first terminal device based on the device identifier, so that the network device can be prevented from configuring subscription information for an unauthorized device, thereby improving security of a private network.

In a possible design, before the receiving, by the first terminal device, subscription information that is of the first terminal device and that is sent by the network device in the first access mode, the method further includes: sending, by the first terminal device, a first random number to the network device; receiving, by the first terminal device, first verification information sent by the network device, where the first verification information is generated by the network device based on the first random number and a first key; generating, by the first terminal device, fourth verification information based on the first random number and a second key, where the second key is preconfigured in the first terminal device; determining, by the first terminal device, whether the first verification information matches the fourth verification information; and if the first verification information matches the fourth verification information, sending, by the first terminal device, first acknowledgment information to the network device, where the first acknowledgment information is used to indicate that the first terminal device successfully verifies the first verification information. During implementation of this embodiment of the present invention, the network device verifies the identity legality of the first terminal device based on the device identifier, and the first terminal device may verify a network side based on the verification information replied by the network device, so that the network device can be prevented from configuring subscription information for an unauthorized device, and the first terminal device may further perform security authentication on the network side, thereby preventing the terminal device from accessing an illegal network, and improving the security of the private network.

In a possible design, the first key is sent by the second terminal device to the network device in the second access mode. In a possible design, before the receiving, by the first terminal device, subscription information that is of the first terminal device and that is sent by the network device in the first access mode, the method further includes, receiving, by the first terminal device, a second random number sent by the network device; generating, by the first terminal device, second verification information based on the second random number and the second key, where the second key is preconfigured in the first terminal device, and sending, by the first terminal device, the second verification information to the network device, where the second verification information is used by the network device to verify the first terminal device. During implementation of this embodiment of the present invention, the network device verifies the identity legality of the first terminal device based on the device identifier, and the first terminal device may verify the network side based on the verification information replied by the network device, so that the network device can be prevented from configuring subscription information for an unauthorized device; in addition, the first terminal device may further perform security authentication on the network side, thereby preventing the terminal device from accessing an illegal network, and improving the security of the private network.

In a possible design, after the sending, by a first terminal device, a first device identifier to a network device in a first access mode, and before the receiving, by the first terminal device, subscription information that is of the first terminal device and that is sent by the network device in the first access mode, the method further includes: receiving, by the first terminal device, a first token sent by the network device; determining, by the first terminal device, whether the first token matches a preconfigured second token; and if the first token matches the preconfigured second token, sending, by the first terminal device, second acknowledgment information to the network device, where the second acknowledgment information is used to indicate that the first terminal device successfully verifies the first token. During implementation of this embodiment of the present invention, the network device verifies the identity legality of the first terminal device based on the device identifier, and the first terminal device may verify a network side based on the verification information replied by the network device, so that the network device can be prevented from configuring subscription information for an unauthorized device; in addition, the first terminal device may further perform security authentication on the network side, thereby preventing the terminal device from accessing an illegal network, and improving the security of the private network.

In a possible design, the sending, by a first terminal device, a first device identifier to a network device in a first access mode includes: sending, by the first terminal device, a first non-access stratum message to the network device in the first access mode, where the first non-access stratum message carries the first device identifier; and the receiving, by the first terminal device, subscription information that is of the first terminal device and that is sent by the network device in the first access mode includes: receiving, by the first terminal device, a second non-access stratum message sent by the network device in the first access mode, where the second non-access stratum message carries the subscription information of the first terminal device.

In a possible design, the first device identifier includes an international mobile equipment identity IMEI and/or a permanent equipment identity PEI, and the second device identifier includes an IMEI and/or a PEI.

In a possible design, the first access mode is a public network and the second access mode is a private network, or both the first access mode and the second access mode are public networks.

According to a third aspect, an embodiment of the present invention provides a subscription information configuration method, used on a second terminal device side. The method includes: obtaining, by a second terminal device, a second device identifier from a first terminal device; and sending, by the second terminal device, the second device identifier to a network device in a second access mode, where the second device identifier is used by the network device to determine whether the second device identifier matches a first device identifier, to determine whether to send subscription information to the first terminal device and the first device identifier is obtained by the network device from the first terminal device in a first access mode.

During implementation of this embodiment of the present invention, the network device verifies identity legality of the first terminal device based on the device identifier, so that the network device can be prevented from configuring subscription information for an unauthorized device, thereby improving security of a private network.

In a possible design, the method further includes: obtaining, by the second terminal device, a first key from the first terminal device; and sending, by the second terminal device, the first key to the network device in the second access mode.

In a possible design, the first device identifier includes an international mobile equipment identity IMEI and/or a permanent equipment identity PEI, and the second device identifier includes an IMEI and/or a PEI.

In a possible design, the first access mode is a public network and the second access mode is a private network, or both the first access mode and the second access mode are public networks.

According to a fourth aspect, an embodiment of this application provides a network device. The network device may include a plurality of function modules or units, configured to correspondingly perform the subscription information configuration method according to the first aspect.

According to a fifth aspect, an embodiment of this application provides a terminal device. The terminal device is a first terminal device, and the first terminal device may include a plurality of function modules or units, configured to correspondingly perform the subscription information configuration method according to the second aspect.

According to a sixth aspect, an embodiment of this application provides a terminal device. The terminal device is a second terminal device, and the second terminal device may include a plurality of function modules or units, configured to correspondingly perform the subscription information configuration method according to the third aspect.

According to a seventh aspect, an embodiment of this application provides a network device, configured to perform the subscription information configuration method according to the first aspect. The network device may include a memory, a processor, a transmitter, and a receiver. The transmitter and the receiver are configured to communicate with another communications device (such as a first terminal device or a second terminal device). The memory is configured to store code for implementing the subscription information configuration method according to the first aspect. The processor is configured to execute the program code stored in the memory, that is, perform the subscription information configuration method according to the first aspect.

According to an eighth aspect, an embodiment of this application provides a terminal device. The terminal device is a first terminal device, configured to perform the subscription information configuration method according to the second aspect. The first terminal device may include a memory, a processor, a transmitter, and a receiver. The transmitter and the receiver are configured to communicate with another communications device (for example, a network device). The memory is configured to store code for implementing the subscription information configuration method according to the second aspect. The processor is configured to execute the program code stored in the memory, that is, perform the subscription information configuration method according to the second aspect.

According to a ninth aspect, an embodiment of this application provides a terminal device. The terminal device is a second terminal device, configured to perform the subscription information configuration method according to the third aspect. The second terminal device may include a memory, a processor, a transmitter, and a receiver. The transmitter and the receiver are configured to communicate with another communications device (for example, a network device). The memory is configured to store code for implementing the subscription information configuration method according to the third aspect. The processor is configured to execute the program code stored in the memory, that is, perform the subscription information configuration method according to the third aspect.

According to a tenth aspect, an embodiment of this application provides a communications system. The communications system includes a network device, a first terminal device, and a second terminal device, where
the network device may be the network device according to the fourth aspect, or may be the network device according to the seventh aspect:
the first terminal device may be the first terminal device according to the fifth aspect, or may be the first terminal device according to the eighth aspect; and
the second terminal device may be the second terminal device according to the sixth aspect, or may be the second terminal device according to the ninth aspect.

According to an eleventh aspect, this application provides a communications chip. The communications chip may include a processor and one or more interfaces coupled to the processor. The processor may be configured to: invoke, from a memory, a program for implementing the subscription information configuration method according to the first aspect, and execute an instruction included in the program. The interface may be configured to output a data processing result of the processor.

According to a twelfth aspect, this application provides a communications chip. The communications chip may include a processor and one or more interfaces coupled to the processor. The processor may be configured to: invoke, from a memory, a program for implementing the subscription information configuration method according to the second aspect, and execute an instruction included in the program. The interface may be configured to output a data processing result of the processor.

According to a thirteenth aspect, this application provides a communications chip. The communications chip may include a processor and one or more interfaces coupled to the processor. The processor may be configured to: invoke, from a memory, a program for implementing the subscription information configuration method according to the third aspect, and execute an instruction included in the program. The interface may be configured to output a data processing result of the processor.

According to a fourteenth aspect, an embodiment of this application provides a computer-readable storage medium. The computer-readable storage medium stores an instruction, and when the instruction is run on a processor, the processor is enabled to perform the subscription information configuration method according to the first aspect.

According to a fifteenth aspect, an embodiment of this application provides a computer-readable storage medium. The computer-readable storage medium stores an instruction, and when the instruction is run on a processor, the processor is enabled to perform the subscription information configuration method according to the second aspect.

According to a sixteenth aspect, an embodiment of this application provides a computer-readable storage medium. The computer-readable storage medium stores an instruction, and when the instruction is run on a processor, the processor is enabled to perform the subscription information configuration method according to the third aspect.

According to a seventeenth aspect, an embodiment of this application provides a computer program product including an instruction. When the computer program product is run on a processor, the processor is enabled to perform the subscription information configuration method according to the first aspect.

According to an eighteenth aspect, an embodiment of this application provides a computer program product including an instruction. When the computer program product is run on a processor, the processor is enabled to perform the subscription information configuration method according to the second aspect.

According to a nineteenth aspect, an embodiment of this application provides a computer program product including an instruction. When the computer program product is run on a processor, the processor is enabled to perform the subscription information configuration method according to the third aspect.

BRIEF DESCRIPTION OF DRAWINGS

To describe the technical solutions in the embodiments of this application or in the background more clearly, the following describes the accompanying drawings used in describing the embodiments of this application or the background.

DESCRIPTION OF EMBODIMENTS

Terms used in DESCRIPTION OF EMBODIMENTS of this application are only used to explain specific embodiments of this application, and are not intended to limit this application.

Figure 1:
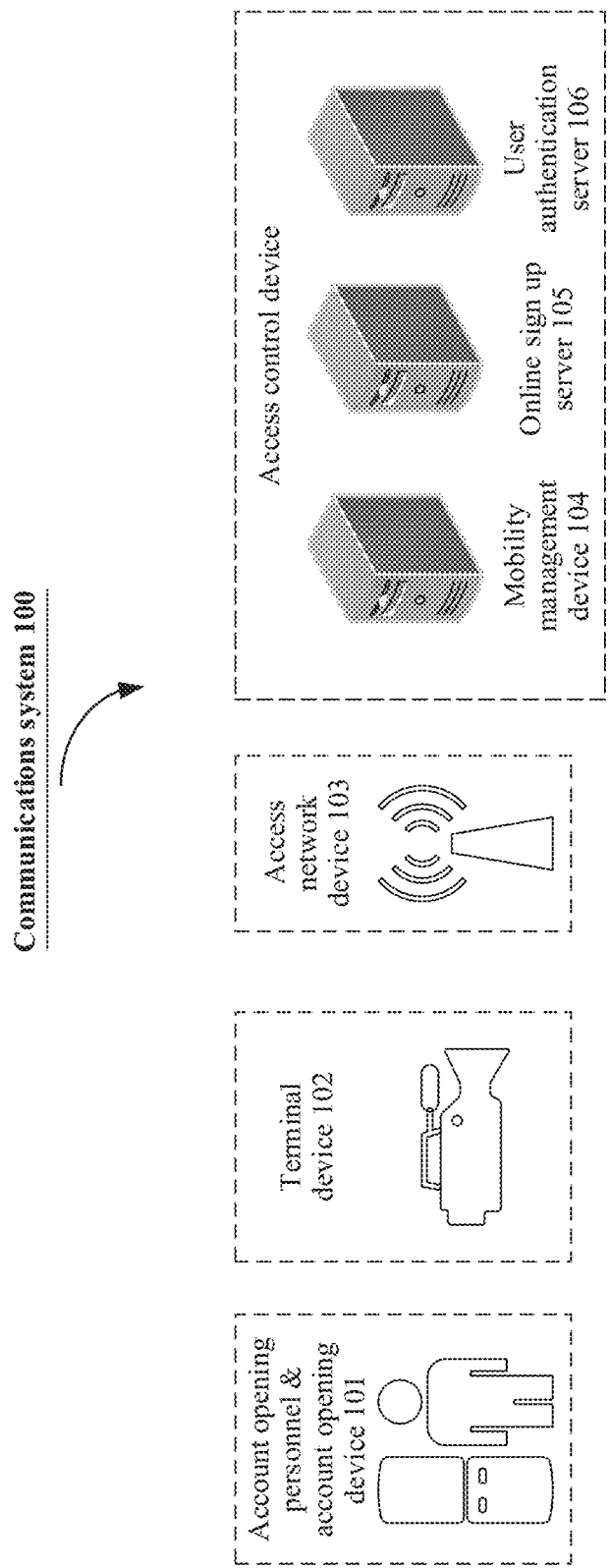
FIG. 1 is a schematic architectural diagram of a communications system according to an embodiment of the present invention.

FIG. 1 is a schematic architectural diagram of a communications system according to an embodiment of the present invention. The communications system may work on a licensed spectrum, or may work on an unlicensed spectrum. The communications system includes but is not limited to a long term evolution (LTE) system, a future evolved 5th generation (5G) mobile communications system, a new radio (NR) system, a machine-to-machine (M2M) communications system, or the like. The communications system 100 includes an account opening device 101, a terminal device 102, an access point (AP) device 103, a mobility management device 104, an online sign up (OSU) server 105, an online sign up authentication, authorization, and accounting (AAA) server 106, and a user authentication server 106.

The account opening device 101 may be a handheld terminal, a mobile phone, or the like. An account opening APP may be pre-installed on the account opening device, and the APP may communicate with the OSU server 105.

The terminal device 102 may also be referred to as user equipment (UE). The terminal device 102 may be a device using a subscriber identity module (SIM) card, or may be a device using a non-SIM card, or may be a device using an embedded SIM (eSM) card. The terminal device in the embodiments of the present invention may be wideband-customer premise equipment (WB-CPE), and is usually an IoT device using a non-SIM card.

The access point device 103 may be a base station, for example, a macro base station, a micro base station (also referred to as a small cell), a relay station, or an access point. In systems using different radio access technologies, names of the access network device 103 may be different. For example, the access network device 103 is referred to as a next-generation NodeB (gNB) in a 5G communications system, or is referred to as an evolved NodeB (eNB or eNodeB) in a long term evolution (LTE) system, or is referred to as a NodeB in a 3rd generation (3G) system. The access point device 103 may alternatively be a wideband access point (WB-AP).

The mobility management device 104 is responsible for access authentication and mobility management functions of the terminal device 102.

The online sign up server 105 is configured to provide subscription information for the device, and may further update subscription storage of an enterprise.

The user authentication server 106 is configured to store user subscription information, and is configured to perform authentication on the terminal device 102 at a stage at which the terminal device 102 accesses a network.

The communications system 100 may be a 4G or 5G system.

For the 4G network system, the mobility management device 104 may be a mobility management entity (MME). The MME is a termination point of non-access stratum (NAS) signaling, is responsible for access authentication and mobility management functions, and is further responsible for a session management function. The user authentication server 106 may be a home subscriber server (HSS), and is configured to: manage user subscription information, and complete authentication on the terminal device 102 at a stage at which the terminal device 102 accesses a network.

For the 5G network system, the mobility management device 104 may be an access and mobility management function (AMF) entity. The AMF is a termination point of NAS signaling, and is responsible for functions such as access authentication and mobility management. The user authentication server 106 may be a unified data management (UDM) function entity, or the user authentication server 106 may be an authentication, authorization, and accounting (AAA) server. The user authentication server 106 is configured to: manage user subscription information, and complete authentication on the terminal device 102 at a stage at which the terminal device 102 accesses a network.

The mobility management device 104, the online sign up server 105, and the user authentication server 106 are all core network elements, and the core network elements may be independent of each other. In an actual application, to facilitate deployment performed by an enterprise, functions of the network elements or some network elements may be integrated into one network element that may be referred to as an access control (AC) device. For example, the AC may integrate an AMF, an OSU server, and an OSU AAA function module. The embodiments of the present invention are mainly for wideband access control (WB-AC).

The access network device 103 may further be integrated with the AC device to form an integrated function entity. For example, functions of all or some of the network elements, namely, the access network device 103, the mobility management device 104, the online sign up server 105, and the user authentication server 106 may be integrated into one network element to form a WB-AP.

The embodiments of the present invention may be applicable to a private network built by an enterprise. For example, an enterprise may build a private network based on a 4G or 5G architecture in a 3GPP manner. To deploy a 3GPP private network, an enterprise needs to purchase an AP for a device to access. The AP may be a base station. The enterprise further needs to purchase core network devices, such as an MME/an AMF and a UDM/an HSS. However, an enterprise does not have as many network service devices as a carrier. Therefore, the enterprise has no high requirement on performance and does not need to purchase various devices. Instead, the enterprise can purchase only one AC device that integrates functions of all or some core network elements to reduce costs. The enterprise may further reduce the costs by purchasing only a WB-AP. In addition, the enterprise needs to deploy some terminal devices to collect data, for example, an air indicator. In this case, the terminal device may be an IoT device, and there are usually a relatively large quantity of such terminal devices. Account opening personnel are required to deploy the terminal devices, and the account opening personnel may deploy the terminal devices by holding an account opening device as an auxiliary in hand. In this way, to avoid configuring subscription information for an unauthorized device, a process of verifying legality of a terminal device is added in the embodiments of the present invention, thereby preventing an illegal terminal device from accessing a private network.

Figure 2:
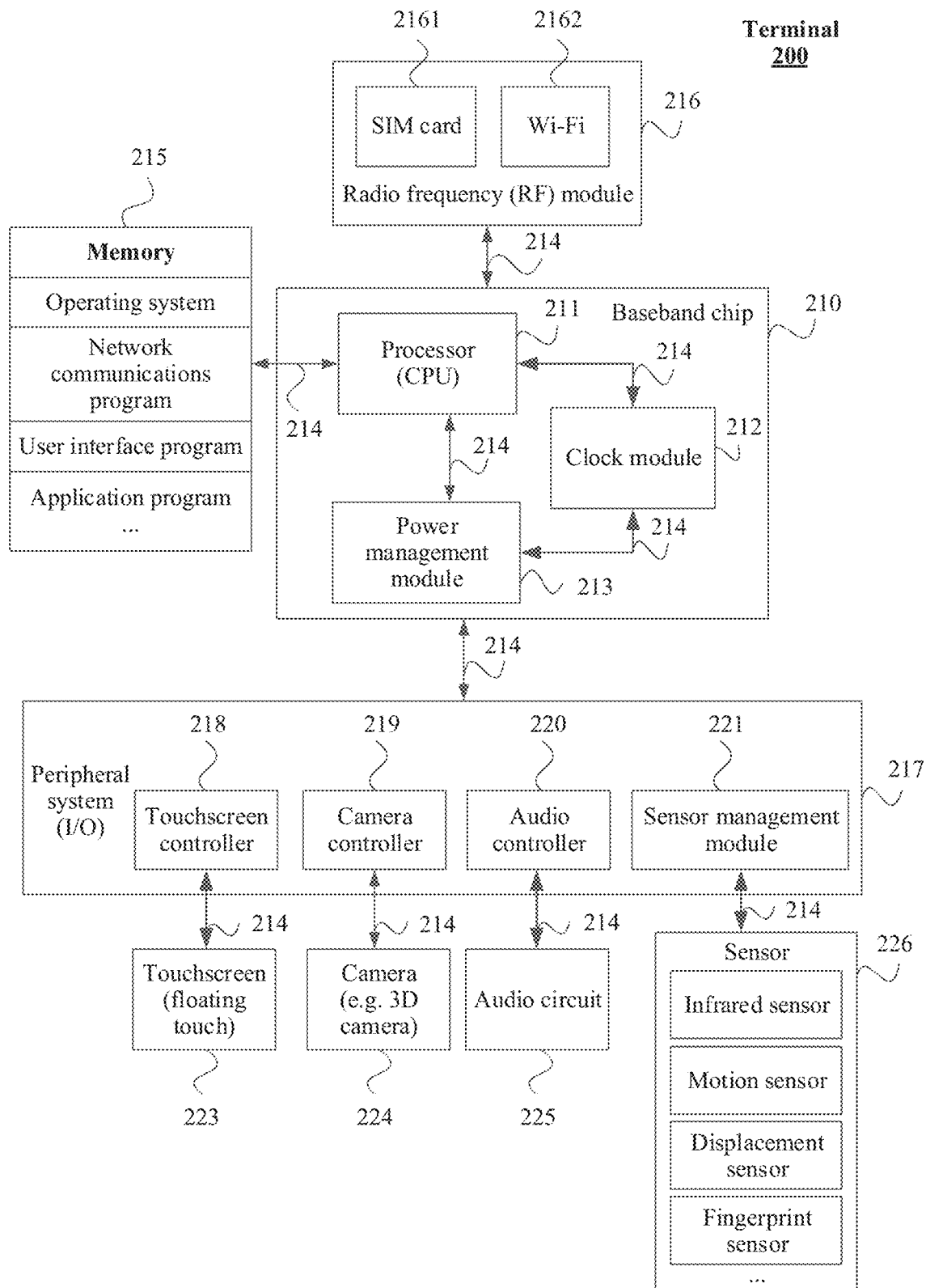
FIG. 2 is a schematic structural diagram of a terminal device according to an embodiment of the present invention.

FIG. 2 is a structural block diagram of an implementation of a terminal device. As shown in FIG. 2, a terminal 200 may include a baseband chip 210, a memory 215 (one or more computer-readable storage media), a radio frequency (RF) module 216, and a peripheral system 217. The components may communicate with each other through one or more communications buses 214.

The peripheral system 217 is mainly configured to implement a function of interaction between the terminal 200 and a user/an external environment, and mainly includes an input/output apparatus of the terminal 200. In a specific implementation, the peripheral system 217 may include one or more of a touchscreen controller 218, a camera controller 219, an audio controller 220, and a sensor management module 221. The controllers may be coupled to respective corresponding peripheral devices (such as a touchscreen 223, a camera 224, an audio circuit 225, and a sensor 226). In some embodiments, the touchscreen 223 may be a touchscreen on which a self-capacitive floating touch panel is configured, or may be a touchscreen on which an infrared floating touch panel is configured. In some embodiments, the camera 224 may be a 3D camera. It should be noted that the peripheral system 217 may further include another I/O peripheral device.

The baseband chip 210 may integrate one or more processors 211, a clock module 212, and a power management module 213. The clock module 212 integrated in the baseband chip 210 is mainly configured to generate, for the processor 211, a clock required for data transmission and time sequence control. The power management module 213 integrated in the baseband chip 210 is mainly configured to provide a stable and high-precision voltage for the processor 211, the radio frequency module 216, and the peripheral system.

The radio frequency (RF) module 216 is configured to send and receive a radio frequency signal, and mainly integrates a receiver and a transmitter of the terminal 200. The radio frequency (RF) module 216 communicates with a communications network and another communications device by using a radio frequency signal. In a specific implementation, the radio frequency (RF) module 216 may include but is not limited to an antenna system, an RF transceiver, one or more amplifiers, a tuner, one or more oscillators, a digital signal processor, a CODEC chip, a SIM card, a storage medium, and the like. In some embodiments, the radio frequency (RF) module 216 may be implemented on an independent chip.

The memory 215 is coupled to the processor 211 and is configured to store various software programs and/or a plurality of sets of instructions. In a specific implementation, the memory 215 may include a high-speed random access memory, and may further include a nonvolatile memory, for example, one or more magnetic disk storage devices, a flash memory device, or another nonvolatile solid-state storage device. The memory 215 may store an operating system (which is referred to as a system for short below), for example, an embedded operating system such as Android, iOS, Windows, or Linux. The memory 215 may further store a network communications program. The network communications program may be configured to communicate with one or more additional devices, one or more terminal devices, or one or more network devices. The memory 215 may further store a user interface program. The user interface program may vividly display content of an application program through a graphical operation interface, and receive, by using input controls such as a menu, a dialog box, and a button, a control operation performed by a user on the application program.

The memory 215 may further store one or more application programs. For example, the terminal 200 may be an account opening device, and the memory 215 may store an account opening APP.

It should be understood that the terminal 200 is merely an example provided in this embodiment of the present invention. In addition, the terminal 200 may include more or fewer components than the shown components, or may combine two or more components, or may have different component configurations.

For structures of the account opening device 101 and the terminal device 102 in the communications system shown in FIG. 1, refer to the structural diagram of the terminal shown in FIG. 2.

Figure 3:
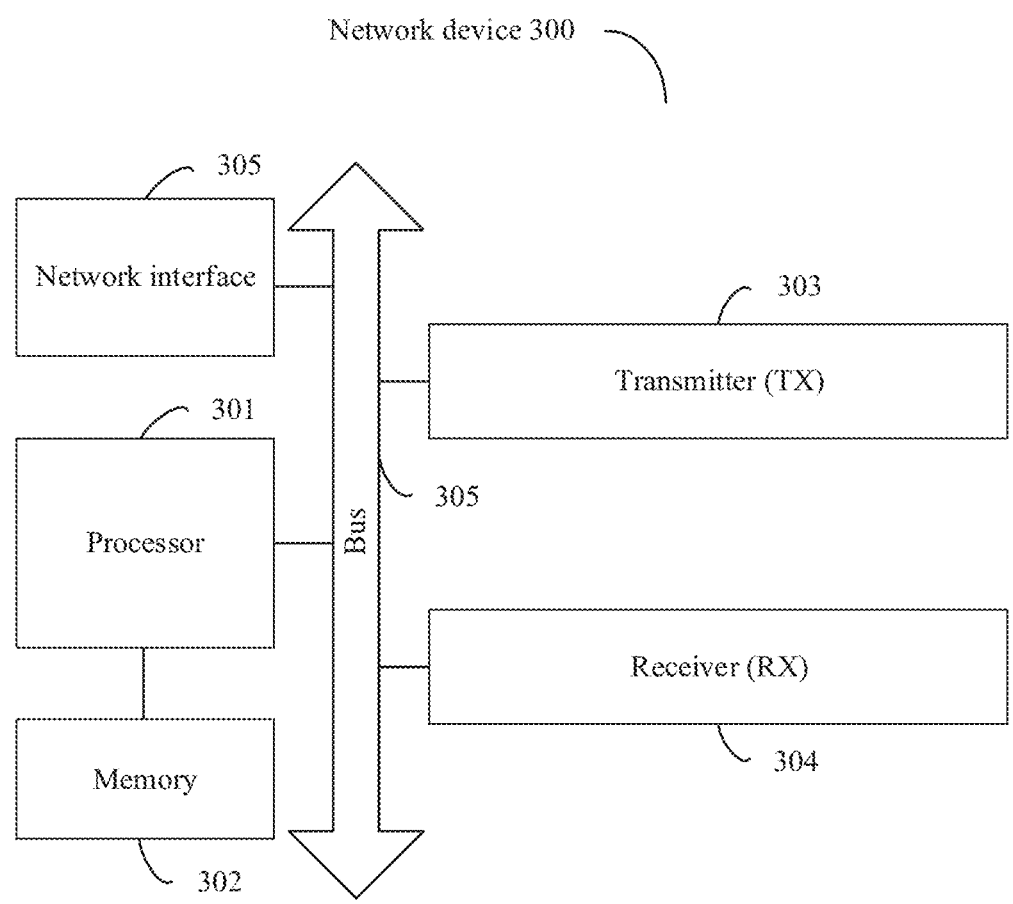
FIG. 3 is a schematic structural diagram of a network device according to an embodiment of the present invention.

FIG. 3 shows a network device 30 according to an embodiment of this application. The network device 30 may include one or more processors 301, a memory 302, a transmitter 303, a receiver 304, and a network interface 305. The components may be connected through a bus 305 or in another manner. In FIG. 3, an example in which the components are connected through the bus is used.

The processor 301 may be a general purpose processor, for example, a central processing unit (CPU), a digital signal processor (DSP), an application-specific integrated circuit (ASIC), or one or more integrated circuits configured to implement the embodiments of the present invention. The processor 301 may process data received through the receiver 304. The processor 301 may further process data to be sent to the transmitter 303.

The memory 302 may be coupled to the processor 301 through the bus 305 or an input/output port, or the memory 302 may be integrated with the processor 301. The memory 302 is configured to store various software programs and/or a plurality of sets of instructions. Specifically, the memory 302 may include a high-speed random access memory, and may further include a nonvolatile memory, for example, one or more magnetic disk storage devices, a flash memory device, or another nonvolatile solid-state storage device. The memory 302 may further store a network communications program. The network communications program may be configured to communicate with one or more additional devices, one or more terminals, or one or more network devices.

The transmitter 303 may be configured to transmit a signal output by the processor 301. The receiver 304 may be configured to receive a to-be-received communication signal. The network device 30 may include one or more transmitters 303 and one or more receivers 304.

In this embodiment of this application, the memory 302 may be configured to store a program for implementing, on a side of the network device 30, a subscription information configuration method according to one or more of the embodiments of this application. For implementation of the subscription information configuration method according to the one or more of the embodiments of this application, refer to descriptions in subsequent method embodiments.

The processor 301 may be configured to read and execute a computer-readable instruction. Specifically, the processor 301 may be configured to: invoke the program stored in the memory 302, for example, the program for implementing, on the side of the network device 30, the subscription information configuration method according to the one or more of the embodiments of this application, and execute an instruction included in the program to implement the method in the subsequent embodiment. Optionally, the processor 301 specifically drives or controls the transmitter 303 to send any message or data. Optionally, the processor 301 specifically drives or controls the receiver 304 to receive any message or data. Therefore, the processor 301 may be considered as a control center for performing sending or receiving, and the transmitter 303 and the receiver 304 are specific executors of sending and receiving operations.

The network interface 305 is used by the network device 300 to communicate with another network device, and the network interface 305 may be a wired interface.

The network device shown in FIG. 3 may be the online sign up server 105 in the communications system shown in FIG. 1, or may be the mobility management device 104 or the user authentication server 106 in the communications system shown in FIG. 1; or the network device may be an AC device that integrates functions of at least two of the network elements, namely, the mobility management device 104, the online sign up server 105, or the user authentication server 106.

Figure 4:
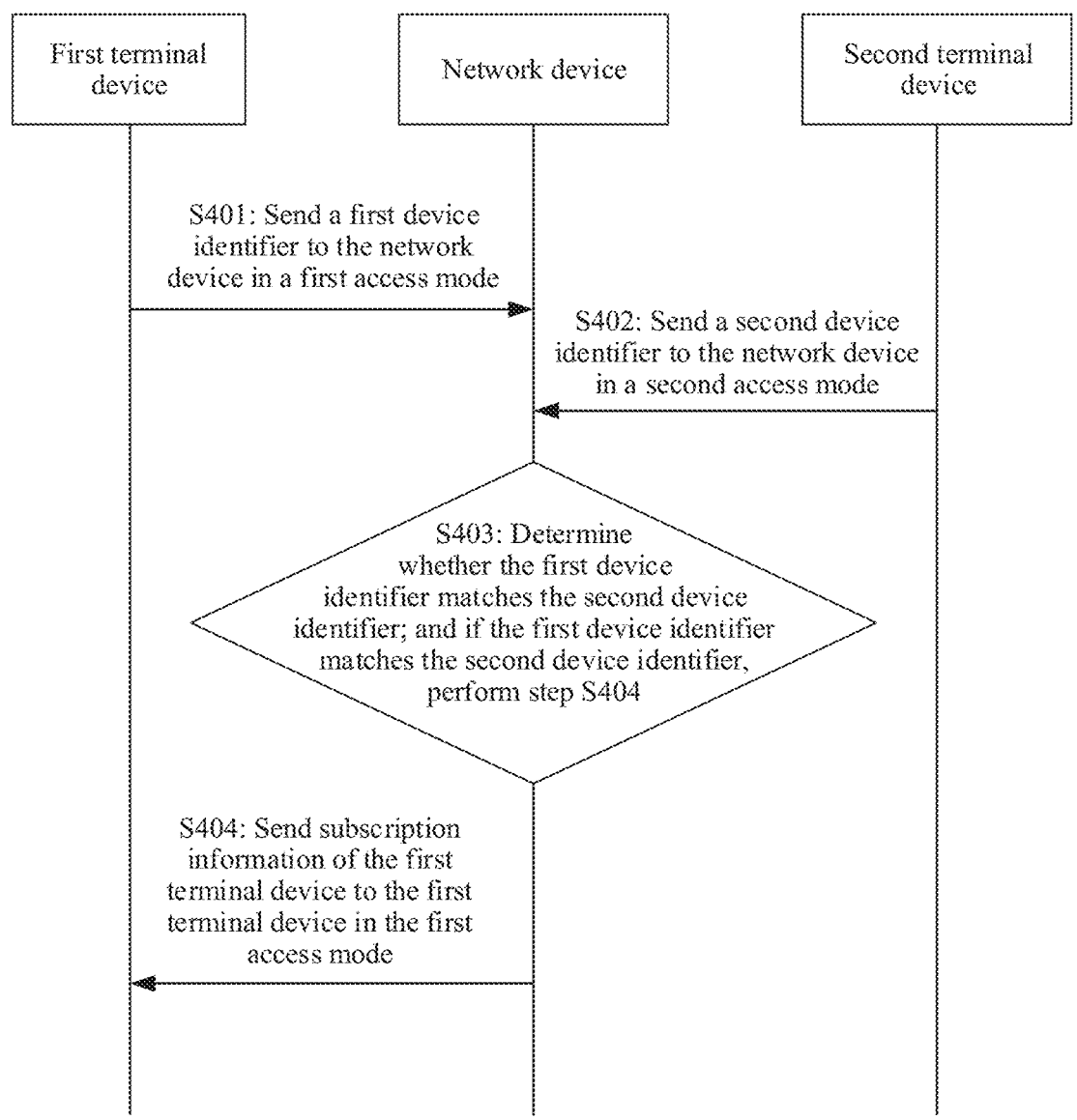
FIG. 4 is a schematic flowchart of a subscription information configuration method according to an embodiment of the present invention.

Based on the devices in the foregoing communications system 100, an embodiment of the present invention provides a subscription information configuration method. As shown in FIG. 4, the method includes but is not limited to the following steps.

S401: A first terminal device sends a first device identifier to a network device in a first access mode, and the network device receives the first device identifier sent by the first terminal device in the first access mode.

S402: A second terminal device sends a second device identifier to the network device in a second access mode, and the network device receives the second device identifier sent by the second terminal device in the second access mode.

S403: The network device determines whether the first device identifier matches the second device identifier; and if the first device identifier matches the second device identifier, the network device performs step S404.

S404: The network device sends subscription information of the first terminal device to the first terminal device in the first access mode, and the first terminal device receives the subscription information that is of the first terminal device and that is sent by the network device in the first access mode.

The first terminal device may be an IoT device, and the second terminal device may be an account opening device.

Optionally, the first device identifier is used to identify the first device, and may include an international mobile equipment identity (IMEI) and/or a permanent equipment identity (PEI).

Optionally, the subscription information may include but is not limited to an international mobile subscriber identity (IMSI) and a root key K.

An execution sequence of steps S401 and S402 is not limited. Step S401 may be performed before step S402, or may be performed after step S402, or step S401 and step S402 may be simultaneously performed.

Optionally, the first access mode is a public network and the second access mode is a private network, or both the first access mode and the second access mode are private networks. The public network may include a wireless access mode in which access is performed by using a licensed spectrum. The private network may include a wireless access mode in which access is performed by using an unlicensed spectrum. The public network and the private network are distinguished based on different spectrums used for communication. For example, the public network is a network deployed by a carrier (such as China Mobile, China Unicorn, or China Telecom), and the private network is a network deployed by an enterprise. Because the first terminal device has not accessed the private network before receiving the subscription information delivered by the network device, the first terminal device may communicate with the network device through the public network. However, because the second terminal device has accessed the private network before sending the second device identifier to the network device, the second terminal device may communicate with the network device through the public network or the private network. For the public network, the terminal device and the network device may communicate with each other in a 3GPP manner or through a wireless local area network (WLAN). For the private network, the terminal device and the network device may communicate with each other in a 3GPP manner, through a WLAN, or through short distance communication (including but not limited to Bluetooth, ZigBee, and the like). Optionally, the second device identifier may be obtained from the first terminal device by account opening personnel holding the second terminal device. In an implementation, the account opening personnel use the second terminal device to scan a two-dimensional code pasted on the first terminal device, and obtain the second device identifier based on the two-dimensional code. In another implementation, the account opening personnel read a label pasted on the first terminal device, where the label has identification information of the first terminal device; and the account opening personnel enter the identification information of the first terminal device into the second terminal device, so that the second terminal device obtains the second device identifier.

The second terminal device may send the second device identifier to the network device through an application layer data channel. For example, the second terminal device is an application client, the network device is an application server, and the second terminal device pre-registers an account with the application server. When preparing device deployment, the account opening personnel use the registered account to log in to an APP. Each time the account opening personnel scan a two-dimensional code of one first terminal device, the second terminal device encapsulates an identifier of the first terminal device by using an application data packet, and uploads the encapsulated identifier to the application server.

The determining, by the network device, whether the first device identifier matches the second device identifier may be: determining whether the first device identifier is the same as the second device identifier.

Optionally, a timer may be set on the network device. When the network device receives the first device identifier, if the network device still does not receive, before the timer expires, the second device identifier sent by the second terminal device, it is considered that the subscription information fails to be configured this time, and a connection between the network device and the first terminal device is released. Alternatively, when the network device receives the second device identifier, if the network device still does not receive, before the timer expires, the first device identifier sent by the first terminal device, it is considered that the subscription information fails to be configured this time.

Optionally, for a scenario in which the account opening device cannot access a network, the account opening device temporarily stores the second device identifier of the first terminal device, and then the account opening device returns to a place having a network, to import or send the stored second device identifier to the network device, or directly imports or sends the stored second device identifier to the network device through a wired network. After the first terminal device accesses the network device again, the network device verifies identity legality of the first terminal device.

In the embodiment shown in FIG. 4, a sequence of step S401 and step S402 is not limited.

Implementation of the method embodiment shown in FIG. 4 has the following technical effects: The network device verifies the identity legality of the first terminal device based on the device identifier, so that the network device can be prevented from configuring subscription information for an unauthorized device, thereby improving security of a private network.

Optionally, after step S403 and before step S404, the method further includes the following steps S405 to S408. In FIG. 5:

S405: If the first device identifier matches the second device identifier, the network device sends first verification information to the first terminal device, and the first terminal device receives the first verification information sent by the network device, where the first verification information is generated based on a first random number and a first key.

The first random number is sent by the first terminal device to the network device. The first terminal device may simultaneously send the first device identifier and the first random number to the network device, or may separately send the first device identifier and the first random number to the network device. For example, the first terminal device sends the first device identifier and the first key to the network device in the first access mode. The first random number may be randomly generated by the first terminal device.

The first key may be a root key of the first terminal device, or may be a key derived by the network device based on a root key of the first terminal device. The root key of the first terminal device is sent by the second terminal device to the network device. The second terminal device may simultaneously send the second device identifier and the root key of the first terminal device to the network device, or may separately send the second device identifier and the root key of the first terminal device to the network device. For example, the second terminal device sends the second device identifier and the root key of the first terminal device to the network device in the second access mode. The second terminal device may obtain the root key of the first terminal device from the first terminal device, and then send the root key of the first terminal device to the network device. A manner in which the second terminal device obtains the root key of the first terminal device may be as follows In an implementation, the second terminal device scans a two-dimensional code pasted on the first terminal device, and obtains the root key of the first terminal device based on the two-dimensional code. In another implementation, the account opening personnel read a label pasted on the first terminal device, where the label includes the root key of the first terminal device; and the account opening personnel enter the root key of the first terminal device into the second terminal device. The root key of the first terminal device is preconfigured in the first terminal device by a device vendor. If the root key is preconfigured, the device vendor may further implant the root key into the two-dimensional code. Therefore, the second terminal device may obtain the root key of the first terminal device in addition to an identifier of the first terminal device by scanning the two-dimensional code.

The network device generates the first verification information based on the first random number and the first key.

S406: The first terminal device generates fourth verification information based on the first random number and a second key.

The second key may be the root key of the first terminal device, or may be a key derived by the first terminal device based on the root key of the first terminal device. In addition, a manner in which the network device derives the first key is the same as a manner in which the first terminal device derives the second key.

S407: The first terminal device determines whether the first verification information matches the fourth verification information; and if the first verification information matches the fourth verification information, the first terminal device performs step S408.

S408: The first terminal device sends first acknowledgment information to the network device, and the network device receives the first acknowledgment information sent by the first terminal device, where the first acknowledgment information is used to indicate that the first terminal device successfully verifies the first verification information.

After receiving the first acknowledgment information from the first terminal device, the network device sends the subscription information to the first terminal device.

Figure 5A:
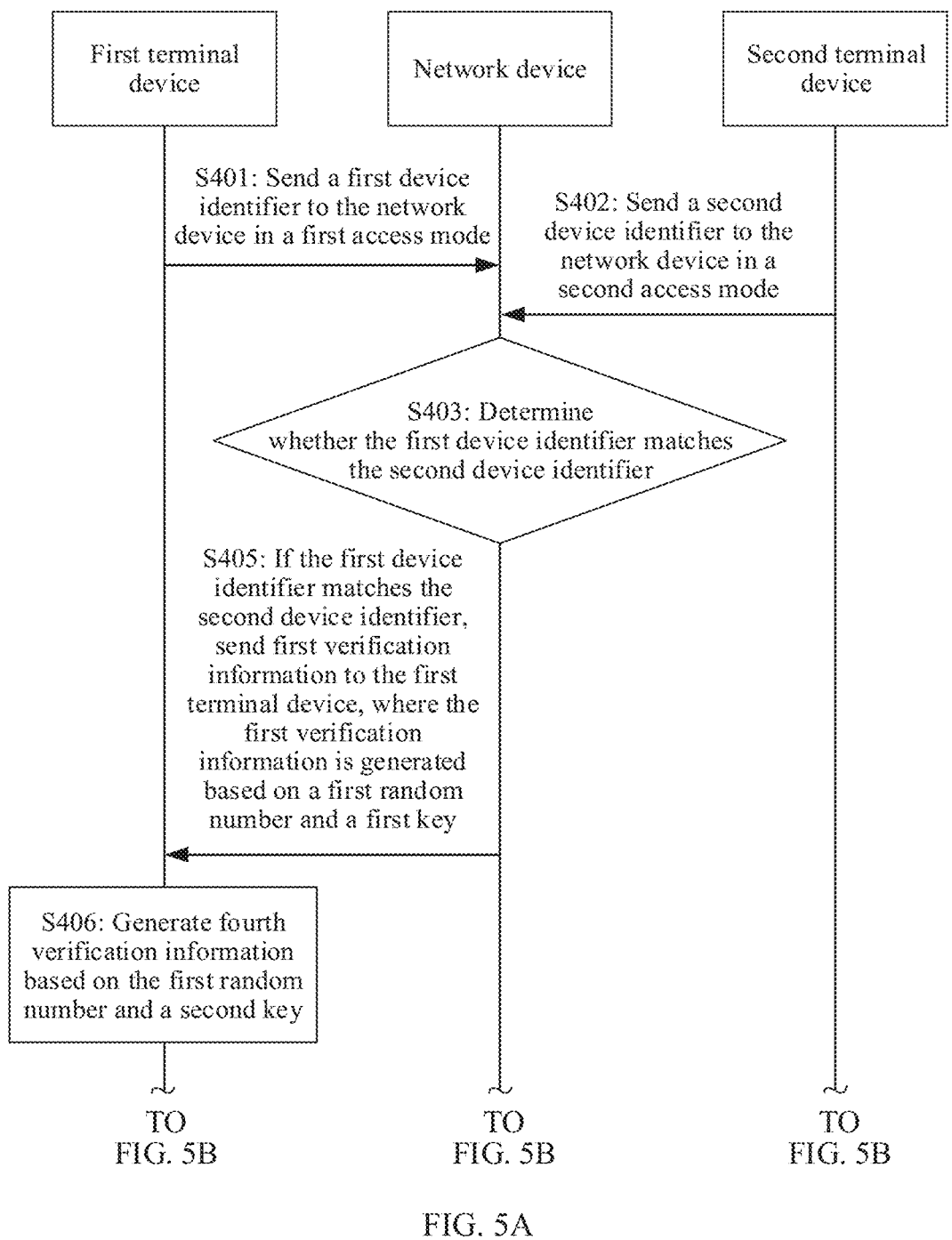
FIG. 5A and FIG. 5B are a schematic flowchart of another subscription information configuration method according to an embodiment of the present invention.
Figure 5B:
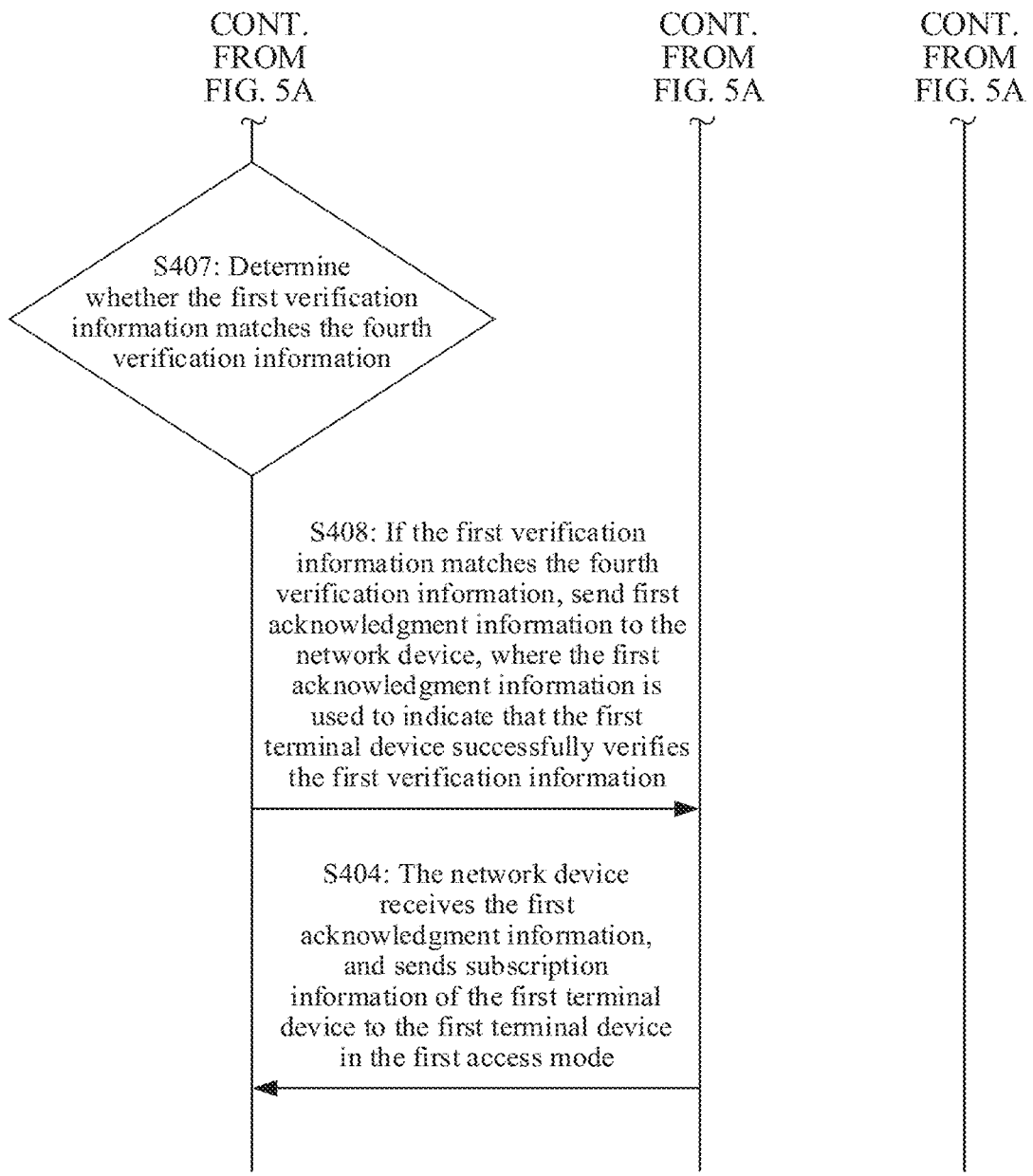

Implementation of the method embodiment shown in FIG. 5A and FIG. 5B has the following technical effects: The network device verifies the identity legality of the first terminal device based on the device identifier, and the first terminal device may verify a network side based on the verification information replied by the network device, so that the network device can be prevented from configuring subscription information for an unauthorized device; in addition, the first terminal device may further perform security authentication on the network side, thereby preventing the terminal device from accessing an illegal network, and improving the security of the private network.

Figure 6:
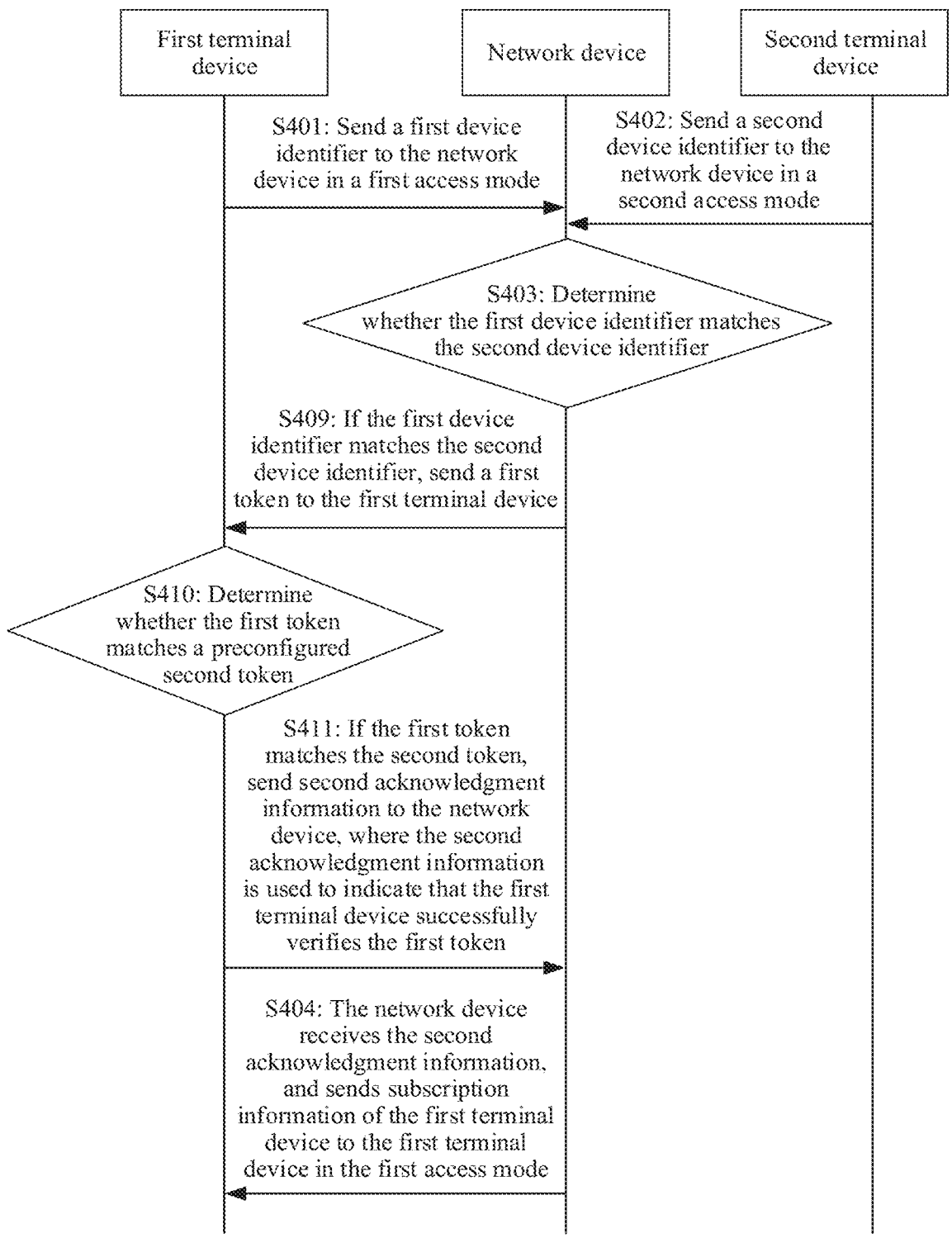
FIG. 6 is a schematic flowchart of another subscription information configuration method according to an embodiment of the present invention.

After step S403 and before step S404, the method further includes steps S409 to S411. In FIG. 6:

S409: If the first device identifier matches the second device identifier, the network device sends a first token to the first terminal device, and the first terminal device receives the first token sent by the network device, where the first token is obtained by the network device from the second terminal device.

The second terminal device may send the first token to the network device in the second access mode. The first token is obtained by the second terminal device from the first terminal device. A manner in which the second terminal device obtains the first token of the first terminal device may be as follows In an implementation, the second terminal device scans a two-dimensional code pasted on the first terminal device, and obtains the first token of the first terminal device based on the two-dimensional code. In another implementation, the account opening personnel read a label pasted on the first terminal device, where the label includes the first token of the first terminal device; and the account opening personnel enter the first token of the first terminal device into the second terminal device. The token is preconfigured in the first terminal device, and the token may be a random character string.

S410: The first terminal device determines whether the first token matches a preconfigured second token; and if the first token matches the preconfigured second token, the first terminal device performs step S411.

The second token is preconfigured in the first terminal device. A manner in which the first terminal device determines whether the first token matches the preconfigured second token may be as follows: The first terminal device determines whether the second token configured by the first terminal device is the same as the first token sent by the network device.

S411: The first terminal device sends second acknowledgment information to the network device, and the network device receives the second acknowledgment information sent by the first terminal device, where the second acknowledgment information is used to indicate that the terminal device successfully verifies the first token.

After receiving the second acknowledgment information from the first terminal device, the network device sends the subscription information to the first terminal device.

Implementation of the method embodiment shown in FIG. 6 has the following technical effects: The network device verifies the identity legality of the first terminal device based on the device identifier, and the first terminal device may verify a network side based on the token information replied by the network device, so that the network device can be prevented from configuring subscription information for an unauthorized device, and the terminal device is prevented from accessing an illegal network, thereby improving the security of the private network. Compared with the method embodiment shown in FIG. 5A and FIG. 5B, the method embodiment shown in FIG. 6 lacks processes in which the network device generates the verification information and the terminal device generates the verification information can be reduced, so that calculation overheads are reduced.

Figure 7A:
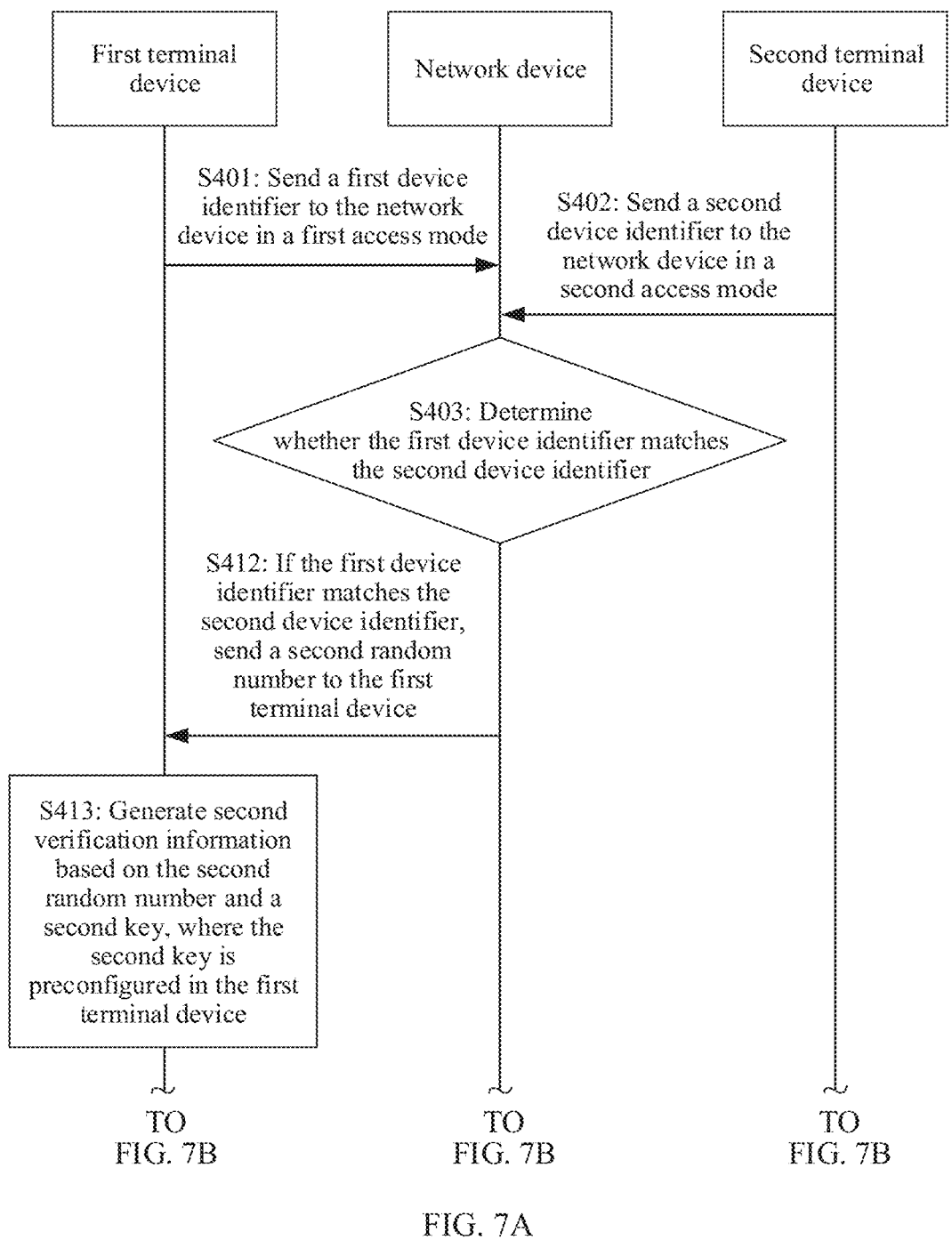
FIG. 7A and FIG. 7B are a schematic flowchart of another subscription information configuration method according to an embodiment of the present invention.
Figure 7B:
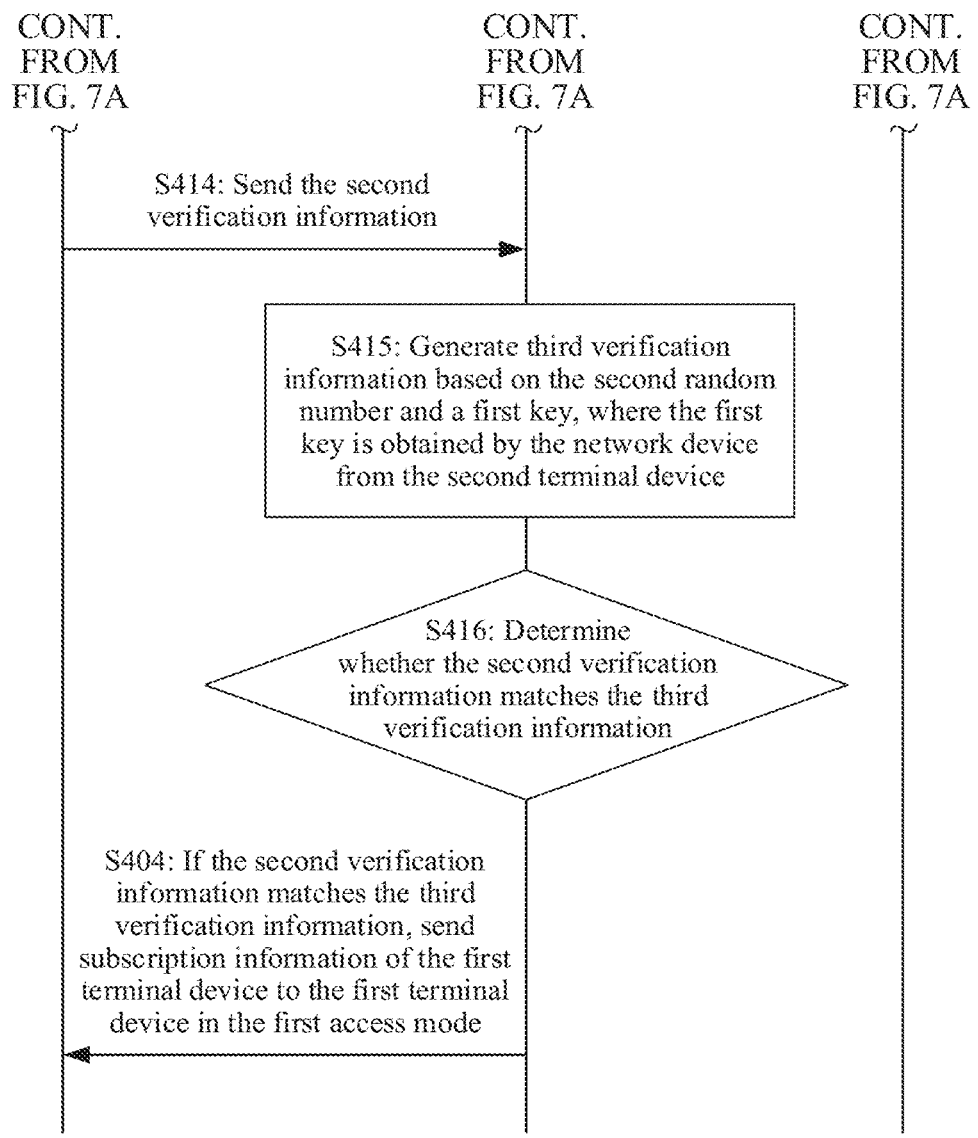

Optionally, after step S403 and before step S404, the method further includes the following steps S412 to S416. In FIG. 7A and FIG. 7B:

S412: If the first device identifier matches the second device identifier, the network device sends a second random number to the first terminal device, and the first terminal device receives the second random number sent by the network device.

The second random number is randomly generated by the network device.

S413: The first terminal device generates second verification information based on the second random number and a second key, where the second key is preconfigured in the first terminal device.

S414: The first terminal device sends the second verification information to the network device, and the network device receives the second verification information sent by the first terminal device.

S415: The network device generates third verification information based on the second random number and a first key, where the first key is obtained by the network device from the second terminal device.

S416: The network device determines whether the second verification information matches the third verification information; and if the second verification information matches the third verification information, the network device performs step S404.

That is, if the second verification information matches the third verification information, the network device sends the subscription information to the first terminal device.

An execution sequence of steps S412 and S415 is not limited.

Implementation of the method embodiment shown in FIG. 7A and FIG. 7B has the following technical effects: The network device verifies the identity legality of the first terminal device based on the device identifier, so that the network device can be prevented from configuring subscription information for an unauthorized device; in addition, a process in which the terminal device verifies a network side is added, thereby preventing the terminal device from accessing an illegal network, and improving the security of the private network.

Optionally, the embodiment shown in FIG. 5A and FIG. 5B or FIG. 6 may further include the foregoing steps S412 to S416.

In the foregoing embodiments shown in FIG. 4 to FIG. 7B, the network device determines, by comparing whether the first device identifier sent by the first terminal device matches the second device identifier sent by the second terminal device, whether the first terminal device is a legal device. In addition, the network device may further locally pre-store a whitelist, and determine, by determining whether the first device identifier sent by the first terminal device exists in the whitelist, whether the first terminal device is legal user equipment. Details are described below.

Figure 8:
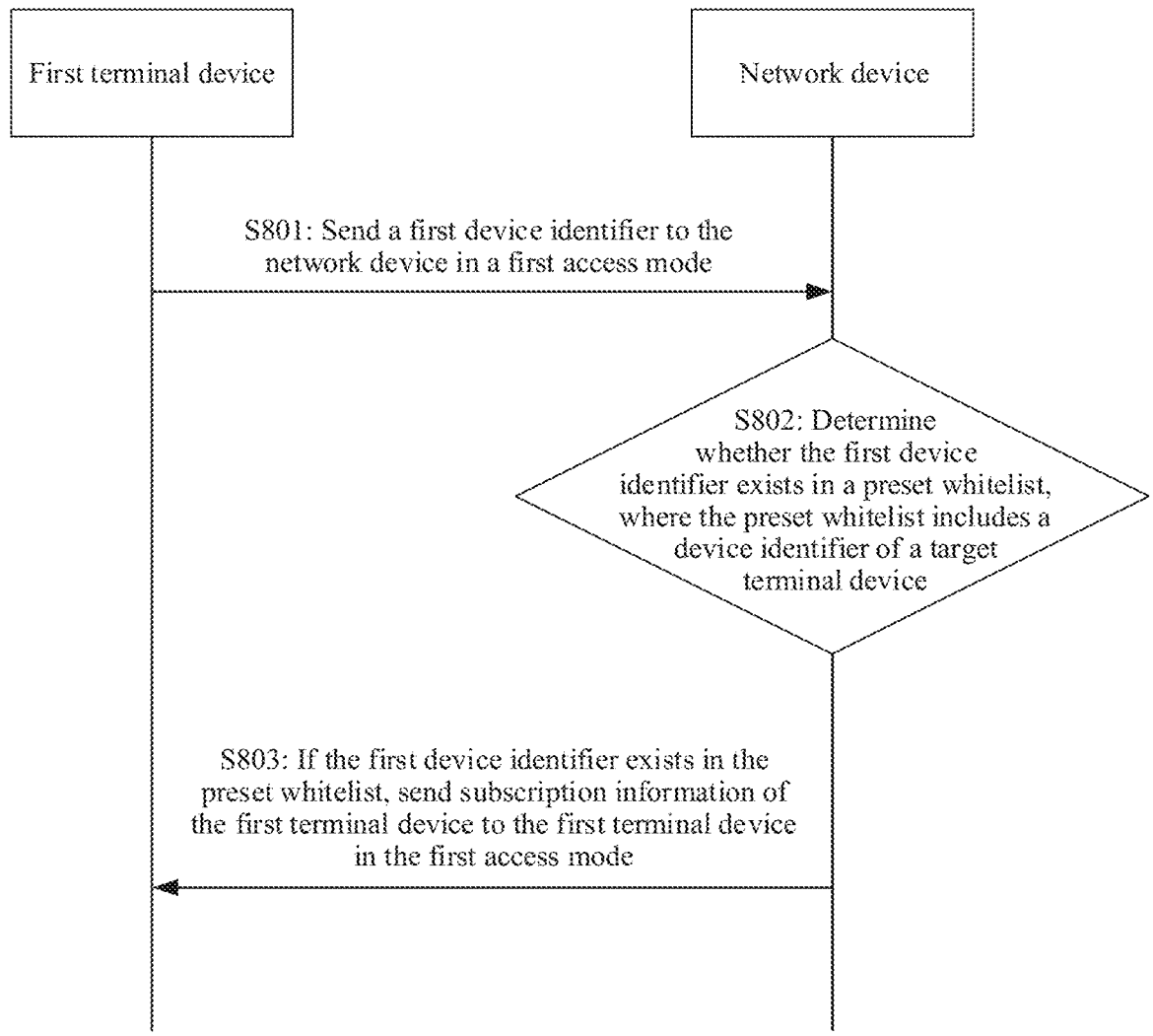
FIG. 8 is a schematic flowchart of another subscription information configuration method according to an embodiment of the present invention.

FIG. 8 is a schematic flowchart of another subscription information configuration method according to an embodiment of the present invention. A process includes the following steps.

S801: A first terminal device sends a first device identifier to a network device in a first access mode, and the network device receives the first device identifier sent by the first terminal device in the first access mode.

S802: The network device determines whether the first device identifier exists in a preset whitelist, and if the first device identifier exists in the preset whitelist, the network device performs step 803, where the preset whitelist includes a device identifier of a target terminal device.

S803: The network device sends subscription information of the first terminal device to the first terminal device in the first access mode, and the first terminal device receives the subscription information that is of the first terminal device and that is sent by the network device in the first access mode.

The target terminal device is a preconfigured legal terminal device. The device identifier that is of the target terminal device and that is included in the preset whitelist may be pre-sent by a second terminal device (namely, an account opening device) to the network device, or may be preconfigured by account opening personnel in the network device based on an account opening device list. Specifically, the account opening personnel may scan two-dimensional codes of first terminal devices one by one by using an account opening device, to obtain device identifiers of the first terminal devices, and then import the device identifiers into the network device by using the account opening device. Alternatively, a device identifier of the first terminal device is pasted on the device, and the account opening personnel may manually enter the device identifier of the first terminal device into the network device.

During implementation of the embodiment shown in FIG. 8, the network device verifies identity legality of the first terminal device based on the device identifier and the preset whitelist, so that the network device can be prevented from configuring subscription information for an unauthorized device. Therefore, a network side performs authentication on the terminal device, and security of a private network is improved.

Optionally, after step S802 and before step S803, the following process may further be included:

If the first device identifier exists in the preset whitelist, the network device sends first verification information to the first terminal device, and the first terminal device receives the first verification information sent by the network device, where the first verification information is generated based on a first random number and a first key. The first random number is obtained from the first terminal in the first access mode. The first key may be a key derived from a root key corresponding to the target terminal device. The first key of the target terminal device may be pre-sent by the second terminal device (namely, the account opening device) to the network device, or may be preconfigured in the network device by the account opening personnel based on the account opening device list. Specifically, the account opening personnel may scan two-dimensional codes of first terminal devices one by one by using the account opening device, to obtain first keys of the first terminal devices, and then import the first keys into the network device by using the account opening device. Alternatively, a first key of the first terminal device is pasted on the device, and the account opening personnel may manually enter the first key of the first terminal device into the network device.

The first terminal device generates fourth verification information based on the first random number and a second key.

The first terminal device determines whether the first verification information matches the fourth verification information; and if the first verification information matches the fourth verification information, the first terminal device performs step S409.

The first terminal device sends first acknowledgment information to the network device, and the network device receives the first acknowledgment information sent by the first terminal device, where the first acknowledgment information is used to indicate that the terminal device successfully verifies the first verification information.

If the network device receives the first acknowledgment information from the first terminal device, the network device performs step S803, that is, the network device sends the subscription information of the first terminal device to the first terminal device in the first access mode.

For detailed descriptions of the foregoing process, refer to the foregoing related descriptions. Details are not described herein again.

Optionally, before step S803, the following process may further be included:

If the first device identifier exists in the preset whitelist, the network device sends a first token to the first terminal device, and the first terminal device receives the first token sent by the network device, where the first token is obtained by the network device from the second terminal device. The first token is a first token corresponding to the target terminal device. The first token of the target terminal device may be pre-sent by the second terminal device (namely, the account opening device) to the network device, or may be preconfigured in the network device by the account opening personnel based on the account opening device list. Specifically, the account opening personnel may scan two-dimensional codes of first terminal devices one by one by using the account opening device, to obtain first tokens of the first terminal devices, and then import the first tokens into the network device by using the account opening device. Alternatively, the first token of the first terminal device is pasted on the device, and the account opening personnel may manually enter the first token of the first terminal device into the network device.

The first terminal device determines whether the first token matches a preconfigured second token; and if the first token matches the preconfigured second token, the first terminal device sends second acknowledgment information to the network device, and the network device receives the second acknowledgment information sent by the first terminal device, where the second acknowledgment information is used to indicate that the terminal device successfully verifies the first token.

If the network device receives the second acknowledgment information from the first terminal device, the network device performs step S803, that is, the network device sends the subscription information of the first terminal device to the first terminal device in the first access mode.

For detailed descriptions of the foregoing process, refer to the foregoing related descriptions. Details are not described herein again.

Optionally, before step S803, the following process may further be included:

If the first device identifier exists in the preset whitelist, the network device sends a second random number to the first terminal device, and the first terminal device receives the second random number sent by the network device.

The first terminal device generates second verification information based on the second random number and a second key, where the second key is preconfigured in the first terminal device.

The first terminal device sends the second verification information to the network device, and the network device receives the second verification information sent by the first terminal device.

The network device generates third verification information based on the second random number and a first key, where the first key is obtained by the network device from the second terminal device. The first key is a key derived from a root key corresponding to the target terminal device. The first key of the target terminal device may be pre-sent by the second terminal device (namely, the account opening device) to the network device, or may be preconfigured in the network device by the account opening personnel based on the account opening device list. Specifically, the account opening personnel may scan two-dimensional codes of first terminal devices one by one by using the account opening device, to obtain first keys of the first terminal devices, and then import the first keys into the network device by using the account opening device. Alternatively, a first key of the first terminal device is pasted on the device, and the account opening personnel may manually enter the first key of the first terminal device into the network device.

The network device determines whether the second verification information matches the third verification information.

If the second verification information matches the third verification information, the network device performs step S803, that is, sends the subscription information of the first terminal device to the first terminal device in the first access mode.

For detailed descriptions of the foregoing process, refer to the foregoing related descriptions. Details are not described herein again.

Optionally, the foregoing processes may alternatively be combined with each other.

In all the foregoing embodiments, the network device verifies whether the first terminal device is legal user equipment. In addition, the second terminal device (namely, the account opening device) may alternatively verify the legality of the first terminal device.

Figure 9:
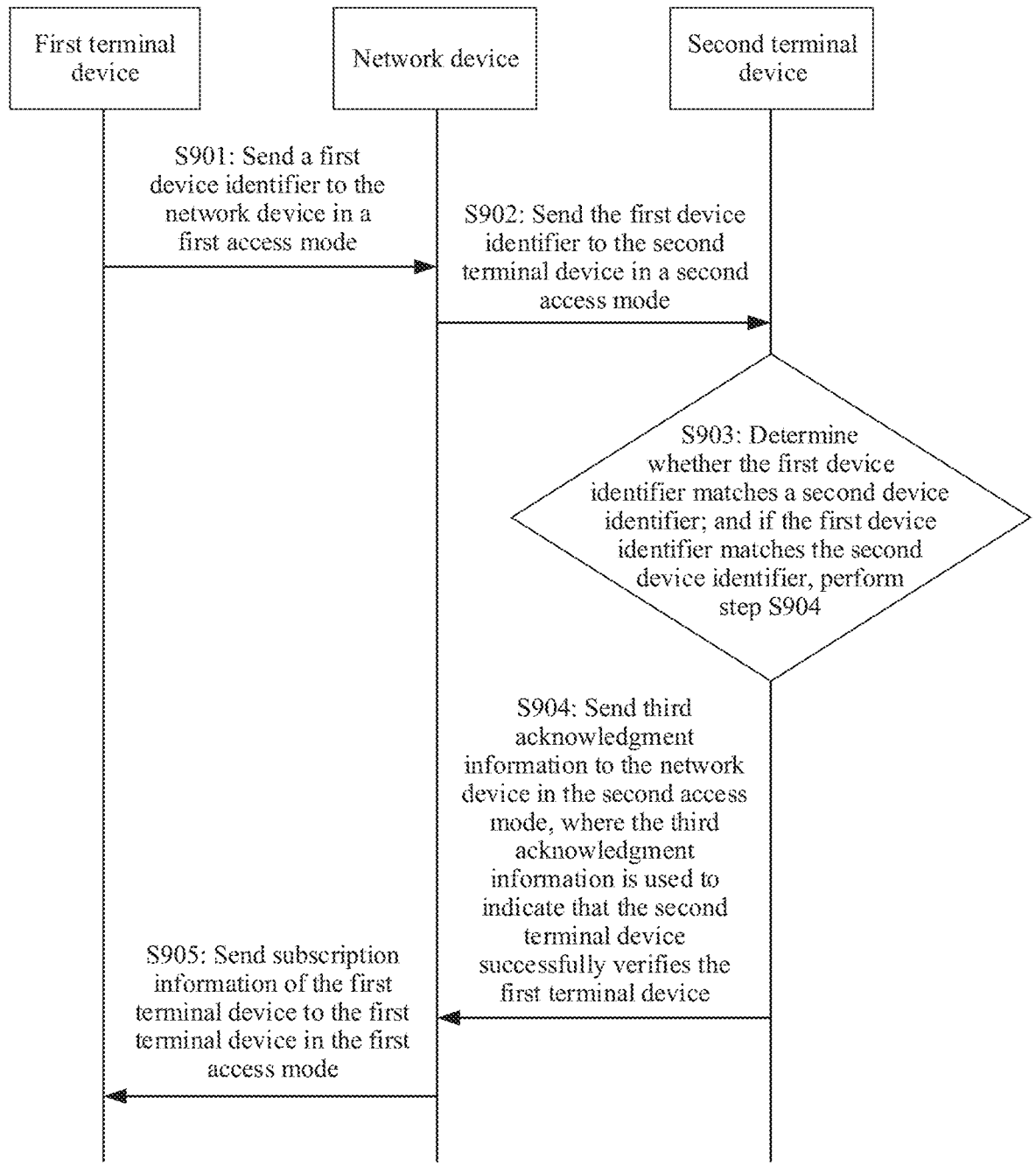
FIG. 9 is a schematic flowchart of another subscription information configuration method according to an embodiment of the present invention.

FIG. 9 is a schematic flowchart of another subscription information configuration method according to an embodiment of the present invention. A process includes the following steps.

S901: A first terminal device sends a first device identifier to a network device in a first access mode, and the network device receives the first device identifier sent by the first terminal device in the first access mode.

S902: The network device sends the first device identifier to a second terminal device in a second access mode, and the second terminal device receives the first device identifier sent by the network device in the second access mode.

S903: The second terminal device determines whether the first device identifier matches a second device identifier, where the second device identifier is obtained by the second terminal device from the first terminal device, and if the first device identifier matches the second device identifier, the second terminal device performs step S904.

S904: The second terminal device sends third acknowledgment information to the network device in the second access mode, and the network device receives the third acknowledgment information sent by the second terminal device in the second access mode, where the third acknowledgment information is used to indicate that the second terminal device successfully verifies the first terminal device.

S905: The network device sends subscription information of the first terminal device to the first terminal device in the first access mode, and the first terminal device receives the subscription information that is of the first terminal device and that is sent by the network device in the first access mode.

The first access mode is a public network and the second access mode is a private network, or both the first access mode and the second access mode are public networks. The public network may include a wireless access mode in which access is performed by using a licensed spectrum. The private network may include a wireless access mode in which access is performed by using an unlicensed spectrum.

Optionally, the second device identifier may be obtained from the first terminal device by account opening personnel holding the second terminal device. In an implementation, the account opening personnel use the second terminal device to scan a two-dimensional code pasted on the first terminal device, and obtain the second device identifier based on the two-dimensional code. In another implementation, the account opening personnel read a label pasted on the first terminal device, where the label has identification information of the first terminal device; and the account opening personnel enter the identification information of the first terminal device into the second terminal device, so that the second terminal device obtains the second device identifier.

The determining, by the second terminal device, whether the first device identifier matches a second device identifier may be: determining whether the first device identifier is the same as the second device identifier.

The network device may send the first device identifier to the second terminal device in the following manners: 1. Application layer data manner: For example, the second terminal device (namely, an account opening device) is an application client, the network device is an application server, and the second terminal device pre-registers an account with the application server. When receiving the first device identifier, the network device pushes the first device identifier to the second terminal device by using an application layer data packet; 2: Short message service (SMS) manner: For example, a mobile number of an account opening device is preconfigured in the network device. When receiving the first device identifier, the network device sends an SMS message to the account opening device, where the SMS message includes the device identifier.

The second terminal device may send the third acknowledgment information to the network device in the following manners: An application layer data packet is replied for the application layer data manner, and an SMS message is replied for the short message service manner. A specific implementation may be as follows: A specific message is used to indicate that current account opening is accepted; or an acknowledgment indication may be included in a message, and the acknowledgment indication is used to indicate that current account opening is accepted. For example, the replied application layer data may be a specific message, or may be a message including a bit. When the bit is 1, it indicates that current account opening is accepted. For another example, the replied SMS message may be a specific SMS message, and the SMS message includes "1" or a character string including "confirm", to indicate that current account opening is accepted.

Optionally, another implementation of step S903 may be as follows: The second terminal device determines whether the first device identifier exists in a preset whitelist; and if the first device identifier exists in the preset whitelist, the second terminal device performs step S904, where the preset whitelist includes a device identifier of a target terminal device.

The target terminal device is a preconfigured legal terminal device. The device identifier that is of the target terminal device and that is included in the preset whitelist may be pre-stored in the second terminal device (namely, the account opening device). Specifically, the account opening personnel may scan two-dimensional codes of first terminal devices one by one by using the account opening device, to obtain device identifiers of the first terminal devices, and then the preset whitelist is generated. Alternatively, the account opening personnel may scan, by using the account opening device, a two-dimensional code on a box in which first terminal devices are encapsulated, to obtain device identifiers of all the first terminal devices in the box, and then the preset whitelist is generated. Alternatively, the device identifier of the first terminal device is pasted on the device, and the account opening personnel may manually enter the device identifier of the first terminal device into the second terminal device, so that the second terminal device generates the preset whitelist.

Implementation of the method embodiment shown in FIG. 9 has the following technical effects: The second terminal device (namely, the account opening device) verifies identity legality of the first terminal device based on the device identifier, and further notifies the network device whether to send the subscription information to the first terminal device, so that the network device can be prevented from configuring subscription information for an unauthorized device, thereby improving security of a private network.

Figure 10A:
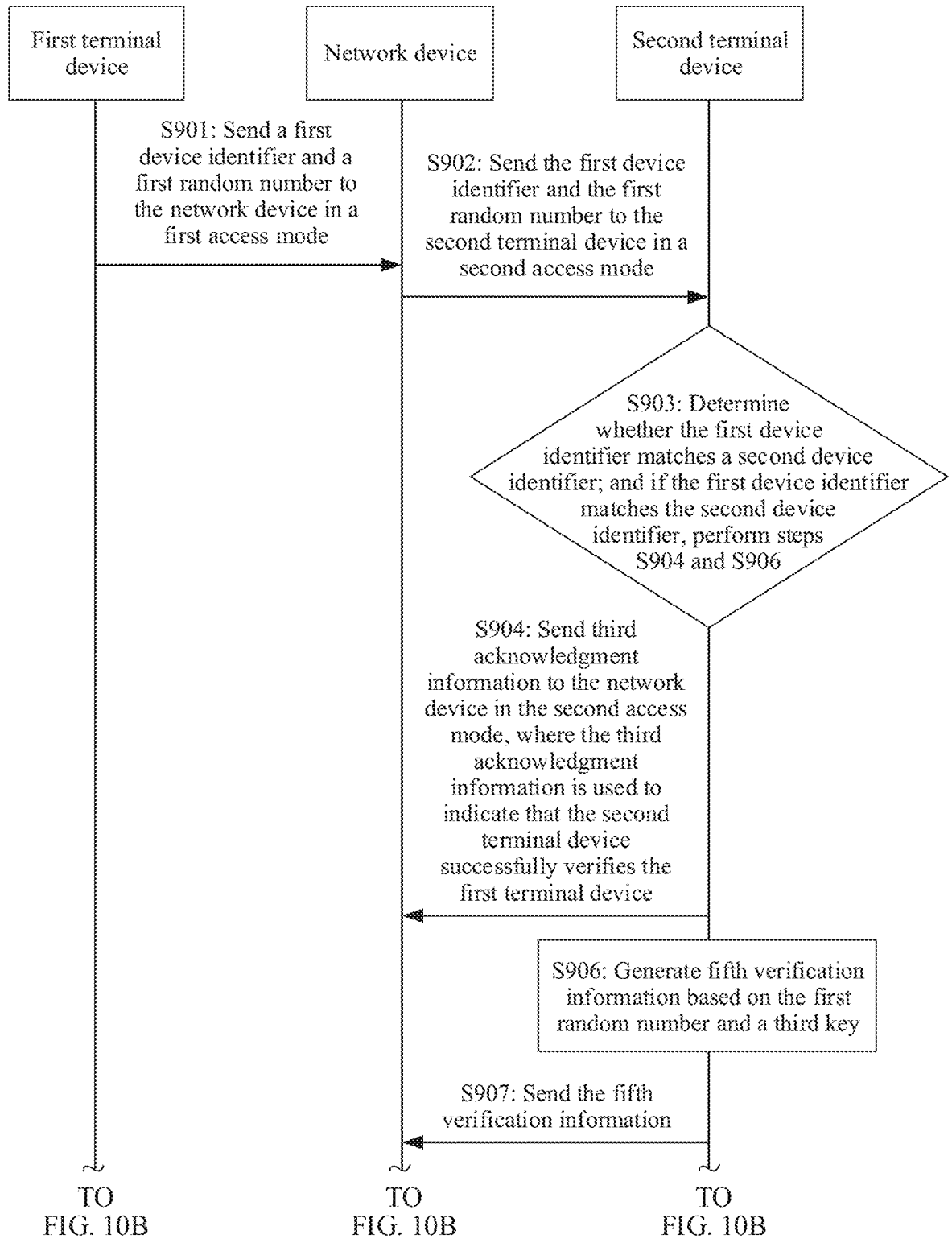
FIG. 10A and FIG. 10B are a schematic flowchart of another subscription information configuration method according to an embodiment of the present invention.
Figure 10B:
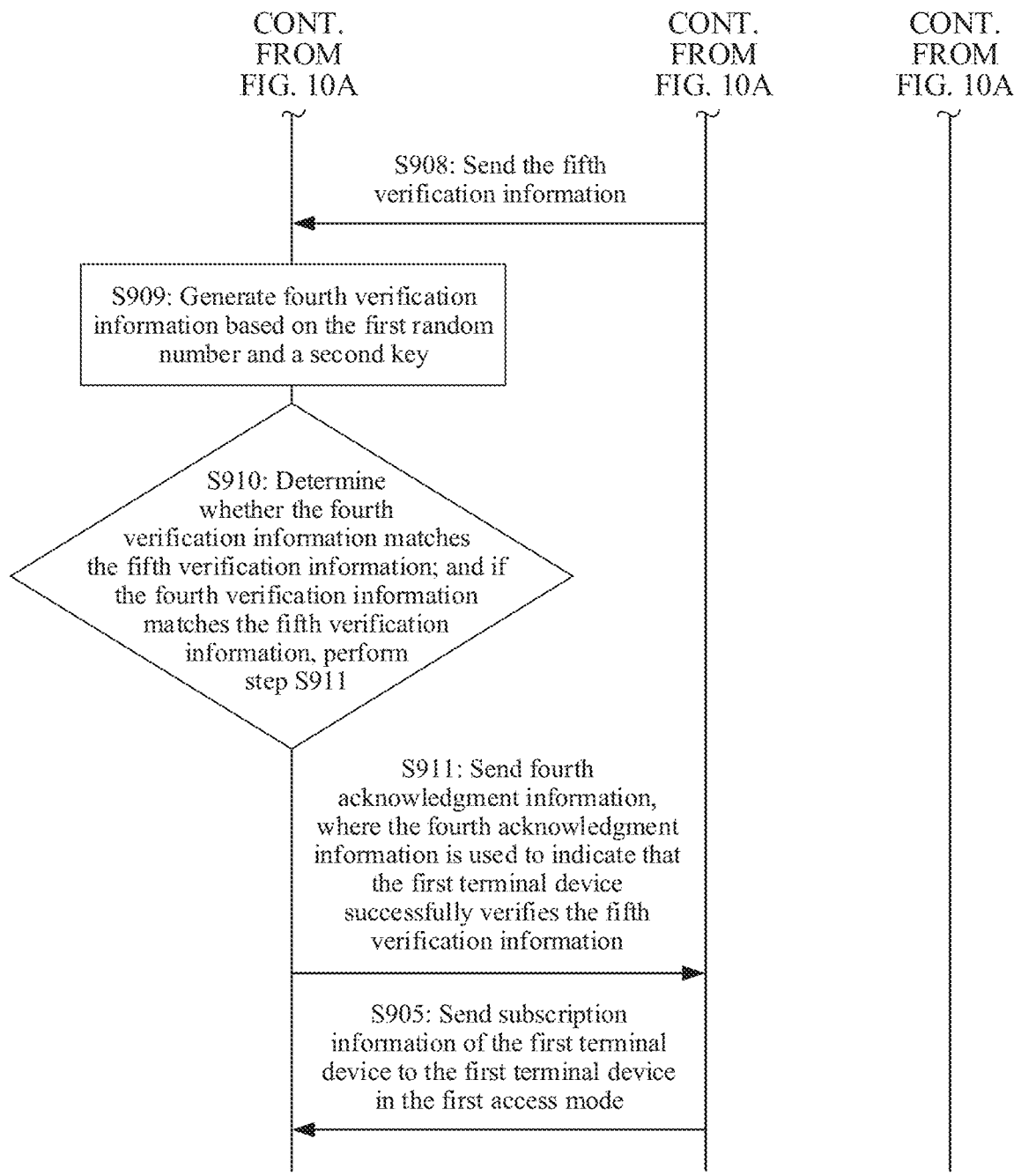

Optionally, referring to FIG. 10A and FIG. 10B, in step S901, the first terminal device sends the first device identifier and a first random number to the network device in the first access mode, and the network device receives the first device identifier and the first random number that are sent by the first terminal device in the first access mode.

In S902, the network device sends the first device identifier and the first random number to the second terminal device in the second access mode, and the second terminal device receives the first device identifier and the first random number that are sent by the network device in the second access mode.

After step S903, the following process may further be included:

S906: The second terminal device generates fifth verification information based on the first random number and a third key.

The third key may be a root key of the first terminal device, or may be a key derived by the second terminal device based on a root key of the first terminal device. In addition, a manner in which the first terminal device derives a first key is the same as a manner in which the second terminal device derives the third key. For example, the second terminal device obtains the root key of the first terminal device by scanning the two-dimensional code of the first terminal device.

S907: The second terminal device sends the fifth verification information to the network device, and the network device receives the fifth verification information sent by the second terminal device.

S908: After receiving the third acknowledgment information, the network device sends the fifth verification information to the first terminal device, and the first terminal device receives the fifth verification information sent by the network device.

S909: The first terminal device generates fourth verification information based on the first random number and a second key.

S910: The first terminal device determines whether the fourth verification information matches the fifth verification information; and if the fourth verification information matches the fifth verification information, the first terminal device performs step S913.

S911: The first terminal device sends fourth acknowledgment information to the network device, and the network device receives the fourth acknowledgment information sent by the first terminal device, where the fourth acknowledgment information is used to indicate that the terminal device successfully verifies the fifth verification information.

If the network device receives the fourth acknowledgment information from the first terminal device, the network device performs step S905, that is, the network device sends the subscription information of the first terminal device to the first terminal device in the first access mode.

An execution sequence of steps S904 and S906 is not limited.

It should be noted that, for a part that is not mentioned in this embodiment of the present invention, refer to the foregoing embodiments, and details are not described herein again.

Optionally, in the foregoing embodiments shown in FIG. 4 to FIG. 9, information transmitted between the first terminal device and the network device may be carried in a hypertext transfer protocol over secure sockets layer (HTTPS) message for transmission. For example, the first terminal device sends an HTTPS message including the first device identifier to the network device, and the network device returns an HTTPS message including the subscription information to the first terminal device. In this case, a packet data unit (PDU) session needs to be pre-created between the first terminal device and the network device, and a process of creating the session relates to a plurality of processes of signal exchange among the first terminal device, an access network device, and a core network device.

To reduce signaling exchange and reduce signaling overheads, the information transmitted between the first terminal device and the network device may alternatively be carried in a non-access stratum (NAS) message for transmission. For example, the network device receives a first non-access stratum message sent by the first terminal device in the first access mode, where the first non-access stratum message carries the first device identifier. The network device sends a second non-access stratum message to the first terminal device, where the second non-access stratum message carries the subscription information of the first terminal device. The first non-access stratum message may be an identity response message or a NAS security mode command (SMC) message. The second non-access stratum message is used to indicate the first terminal device to configure related subscription information, or the second non-access stratum message includes a configuration indication, and the configuration indication is used to indicate the first terminal device to configure related subscription information. The second non-access stratum message may be a deregistration message, and the deregistration message is used to indicate the first terminal device to deregister from a network. In this case, the network device may be an AC device integrating functions of a plurality of core network elements. For example, the AC device integrates functions of one or more of network elements, namely, an MME/AMF an OSU server, an OSU AAA, and an AAA.

FIG. 10A and FIG. 10B are a schematic flowchart of another subscription information configuration method according to an embodiment of the present invention. A process includes the following steps.

S1001: A second terminal device generates subscription information of a first terminal device.

S1002: The second terminal device sends the subscription information of the first terminal device to the first terminal device, and the first terminal device receives the subscription information that is of the first terminal device and that is sent by the second terminal device.

S1003: The second terminal device sends the subscription information of the first terminal device to the network device, and the network device receives the subscription information that is of the first terminal device and that is sent by the second terminal device.

A manner in which the second terminal device generates the subscription information of the first terminal device includes but is not limited to the following two manners:

1. The subscription information of the first terminal device is randomly generated. For example, an account opening device randomly generates an international mobile subscriber identity (IMSI)/a subscriber permanent identifier (SUPI) of the first terminal device and K. However, it needs to be ensured that neither repeated IMSI nor repeated K is generated.

2. The subscription information of the first terminal device may be generated based on a device identifier of the first terminal device. For example, an account opening device generates an IMSI/a SUPI of the first terminal device based on an IMEI/a PEI of the first terminal device. Because the IMEI/PEI corresponds one-to-one to the device, the generated IMS/SUPI is not repeated, and a generation algorithm may be a hash function. The device identifier of the first terminal device may be reported by the first terminal device, or may be obtained by the account opening device by scanning a two-dimensional code of the first terminal device, or may be obtained by account opening personnel by entering the device identifier of the first terminal device into the second terminal device.

A communication manner in which the second terminal device sends the subscription information to the first terminal device may be as follows: 1. Wi-Fi manner: The second terminal device enables a hotspot, and the first terminal device is connected to the second terminal device by using a Wi-Fi protocol for communication. 2. Bluetooth manner: The second terminal device enables Bluetooth, and the first terminal device is connected to the second terminal device by using a Bluetooth protocol. 3. Wired manner: The second terminal device is connected to the first terminal device through a wired interface.

During implementation of the method embodiment shown in FIG. 10A and FIG. 10B, the subscription information is directly and manually imported by the account opening personnel. This can prevent the network device from configuring subscription information for an unauthorized device. After deploying the device, the account opening personnel directly import the subscription information into the device, and then import all the subscription information into the network device after returning to an equipment room. This is applicable to an area without any network.

It should be noted that, in this embodiment of the present invention, a manner of transmitting the information between the first terminal device and the network device may be a first access mode, and a manner of transmitting the information between the second terminal device and the network device may be a second access mode. The first access mode is a public network and the second access mode is a private network, or both the first access mode and the second access mode are public networks. The public network may include a wireless access mode in which access is performed by using a licensed spectrum. The private network may include a wireless access mode in which access is performed by using an unlicensed spectrum.

Figure 11:
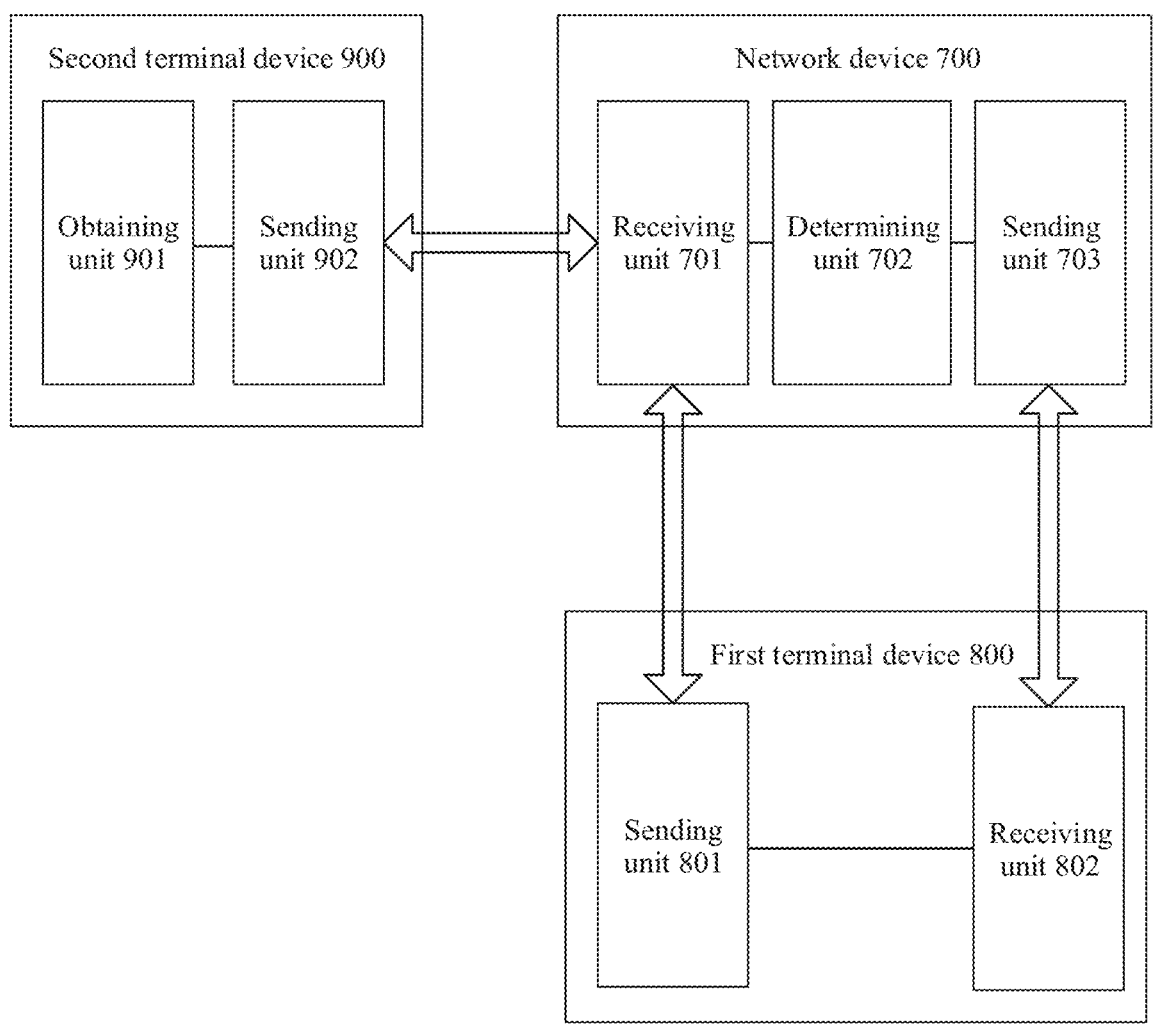
FIG. 11 is a structural block diagram of a communications system including a network device, a first terminal device, and a second terminal device according to an embodiment of the present invention.

FIG. 11 shows a communications system including a network device and a first terminal device according to this application. The communications system 600 includes the network device 700, the first terminal device 800, and the second terminal device 900. The network device 700 may be the network device 101 in the embodiment in FIG. 1. Correspondingly, the first terminal device 800 may be the terminal device 102 in the embodiment in FIG. 1, the second terminal device 900 may be the account opening device 101 in the embodiment in FIG. 1, and the communications system 600 may be the communications system 100 in FIG. 1. Descriptions are separately provided below.

As shown in FIG. 11, the network device 700 may include a receiving unit 701, a determining unit 702, and a sending unit 703, where
the receiving unit 701 is configured to receive a first device identifier sent by the first terminal device in a first access mode;
the receiving unit 701 is further configured to receive a second device identifier sent by the second terminal device in a second access mode;
the determining unit 702 is configured to determine whether the first device identifier matches the second device identifier; and
the sending unit 703 is configured to: if the first device identifier matches the second device identifier, send subscription information of the first terminal device to the first terminal device in the first access mode.

Optionally, the receiving unit 701 is further configured to: before the sending unit 703 sends the subscription information of the first terminal device to the first terminal device in the first access mode, receive a first random number sent by the first terminal device;
the sending unit 703 is further configured to send first verification information to the first terminal device, where the first verification information is generated based on the first random number and a first key; and
that the sending unit 703 is configured to send subscription information of the first terminal device to the first terminal device in the first access mode includes:
if the first device identifier matches the second device identifier, and the network device receives first acknowledgment information from the first terminal device, sending the subscription information of the first terminal device to the first terminal device in the first access mode, where the first acknowledgment information is used to indicate that the terminal device successfully verifies the first verification information.

Optionally, the sending unit 703 is further configured to: before sending the subscription information of the first terminal device to the first terminal device in the first access mode, send a second random number to the first terminal device;
the receiving unit 701 is further configured to receive second verification information sent by the first terminal device, where the second verification information is generated by the first terminal device based on the second random number and a second key;
the determining unit 702 is further configured to determine whether the second verification information matches third verification information, where the third verification information is generated by the network device based on the second random number and the first key; and
that the sending unit 703 is configured to send subscription information of the first terminal device to the first terminal device in the first access mode includes:
if the first device identifier matches the second device identifier, the second verification information matches the third verification information, and the network device receives the first acknowledgment information from the first terminal device, sending the subscription information of the first terminal device to the first terminal device in the first access mode.

Optionally, the sending unit 703 is further configured to: before sending the subscription information of the first terminal device to the first terminal device in the first access mode, send a second random number to the first terminal device;
the receiving unit 701 is further configured to receive second verification information sent by the first terminal device, where the second verification information is generated by the first terminal device based on the second random number and a second key;
the determining unit 702 is further configured to determine whether the second verification information matches third verification information, where the third verification information is generated by the network device based on the second random number and the first key; and that the sending unit 703 is configured to send subscription information of the first terminal device to the first terminal device in the first access mode includes:

if the first device identifier matches the second device identifier, and the second verification information matches the third verification information, sending the subscription information of the first terminal device to the first terminal device in the first access mode.

Optionally, the receiving unit 701 is further configured to: before the sending unit 703 sends the subscription information of the first terminal device to the first terminal device in the first access mode, receive the first key sent by the second terminal device in the second access mode.

Optionally, the sending unit 703 is further configured to: after the receiving unit 701 receives the first device identifier sent by the first terminal device in the first access mode, and before the sending unit 703 sends the subscription information of the first terminal device to the first terminal device in the first access mode, send a first token to the first terminal device, where the first token is obtained by the network device from the second terminal device; and that the sending unit 703 is configured to send subscription information of the first terminal device to the first terminal device in the first access mode includes:

if the first device identifier matches the second device identifier, and the network device receives second acknowledgment information from the first terminal device, sending the subscription information of the first terminal device to the first terminal device in the first access mode, where the second acknowledgment information is used to indicate that the first terminal device successfully verifies the first token.

Optionally, that the receiving unit 701 is configured to receive a first device identifier sent by the first terminal device in a first access mode includes:

receiving a first non-access stratum message sent by the first terminal device in the first access mode, where the first non-access stratum message carries the first device identifier; and that the sending unit 703 is configured to send subscription information of the first terminal device to the first terminal device includes:

sending a second non-access stratum message to the first terminal device, where the second non-access stratum message carries the subscription information of the first terminal device.

Optionally, the first device identifier includes an international mobile equipment identity IMEI and/or a permanent equipment identity PEI, and the second device identifier includes an IMEI and/or a PEI.

Optionally, the first access mode is a public network and the second access mode is a private network, or both the first access mode and the second access mode are public networks.

It may be understood that for specific implementations of the function units included in the network device 700, refer to the foregoing embodiments. Details are not described herein again.

As shown in FIG. 11, the first terminal device 800 may include a sending unit 801 and a receiving unit 802, where the sending unit 801 is configured to send the first device identifier to the network device in the first access mode; and the receiving unit 802 is configured to receive the subscription information that is of the first terminal device and that is sent by the network device in the first access mode, where the subscription information is sent by the network device after the network device determines that the first device identifier matches the second device identifier, and the second device identifier is sent by the second terminal device to the network device in the second access mode.

Optionally, the sending unit 801 is further configured to: before the receiving unit 802 receives the subscription information that is of the first terminal device and that is sent by the network device in the first access mode, send the first random number to the network device:

the receiving unit 802 is further configured to receive the first verification information sent by the network device, where the first verification information is generated by the network device based on the first random number and the first key;

the first terminal device 800 further includes:

a generation unit, configured to generate fourth verification information based on the first random number and the second key, where the second key is preconfigured in the first terminal device; and a determining unit, configured to determine whether the first verification information matches the fourth verification information; and the sending unit 801 is further configured to: if the first verification information matches the fourth verification information, send the first acknowledgment information to the network device, where the first acknowledgment information is used to indicate that the first terminal device successfully verifies the first verification information.

Optionally, the first key is sent by the second terminal device to the network device in the second access mode.

Optionally, the receiving unit 802 is further configured to: before receiving the subscription information that is of the first terminal device and that is sent by the network device in the first access mode, receive the second random number sent by the network device:

the first terminal device 800 further includes:

the generation unit is configured to generate the second verification information based on the second random number and the second key, where the second key is preconfigured in the first terminal device; and the sending unit is 801 is further configured to send the second verification information to the network device, where the second verification information is used by the network device to verify the first terminal device.

Optionally, the receiving unit 802 is further configured to: after the sending unit 801 sends the first device identifier to the network device in the first access mode, and before the receiving unit 802 receives the subscription information that is of the first terminal device and that is sent by the network device in the first access mode, receive the first token sent by the network device:

the first terminal device 800 further includes:

a determining unit, configured to determine whether the first token matches a preconfigured second token; and the sending unit 801 is further configured to: if the first token matches the preconfigured second token, send the second acknowledgment information to the network device, where the second acknowledgment information is used to indicate that the first terminal device successfully verifies the first token.

Optionally, that the sending unit 801 is configured to send the first device identifier to the network device in the first access mode includes:

sending the first non-access stratum message to the network device in the first access mode, where the first non-access stratum message carries the first device identifier; and that the receiving unit 802 is configured to receive the subscription information that is of the first terminal device and that is sent by the network device in the first access mode includes:

receiving the second non-access stratum message sent by the network device in the first access mode, where the second non-access stratum message carries the subscription information of the first terminal device.

Optionally, the first device identifier includes an international mobile equipment identity IMEI and/or a permanent equipment identity PEI, and the second device identifier includes an IMEI and/or a PEI.

Optionally, the first access mode is a public network and the second access mode is a private network, or both the first access mode and the second access mode are public networks.

It may be understood that for specific implementations of the function units included in the first terminal device 800, refer to the foregoing embodiments. Details are not described herein again.

As shown in FIG. 11, the second terminal device 900 may include an obtaining unit 901 and a sending unit 902, where the obtaining unit 901 is configured to obtain the second device identifier from the first terminal device; and the sending unit 902 is configured to send the second device identifier to the network device in the second access mode, where the second device identifier is used by the network device to determine whether the second device identifier matches the first device identifier, to determine whether to send the subscription information to the first terminal device; and the first device identifier is obtained by the network device from the first terminal device in the first access mode.

Optionally, the obtaining unit 901 is further configured to obtain the first key from the first terminal device; and the sending unit 902 is further configured to send the first key to the network device in the second access mode.

Optionally, the first device identifier includes an international mobile equipment identity IMEI and/or a permanent equipment identity PEI, and the second device identifier includes an IMEI and/or a PEI.

Optionally, the first access mode is a public network and the second access mode is a private network, or both the first access mode and the second access mode are public networks.

It may be understood that for specific implementations of the function units included in the second terminal device 900, refer to the foregoing embodiments. Details are not described herein again.

Figure 12:
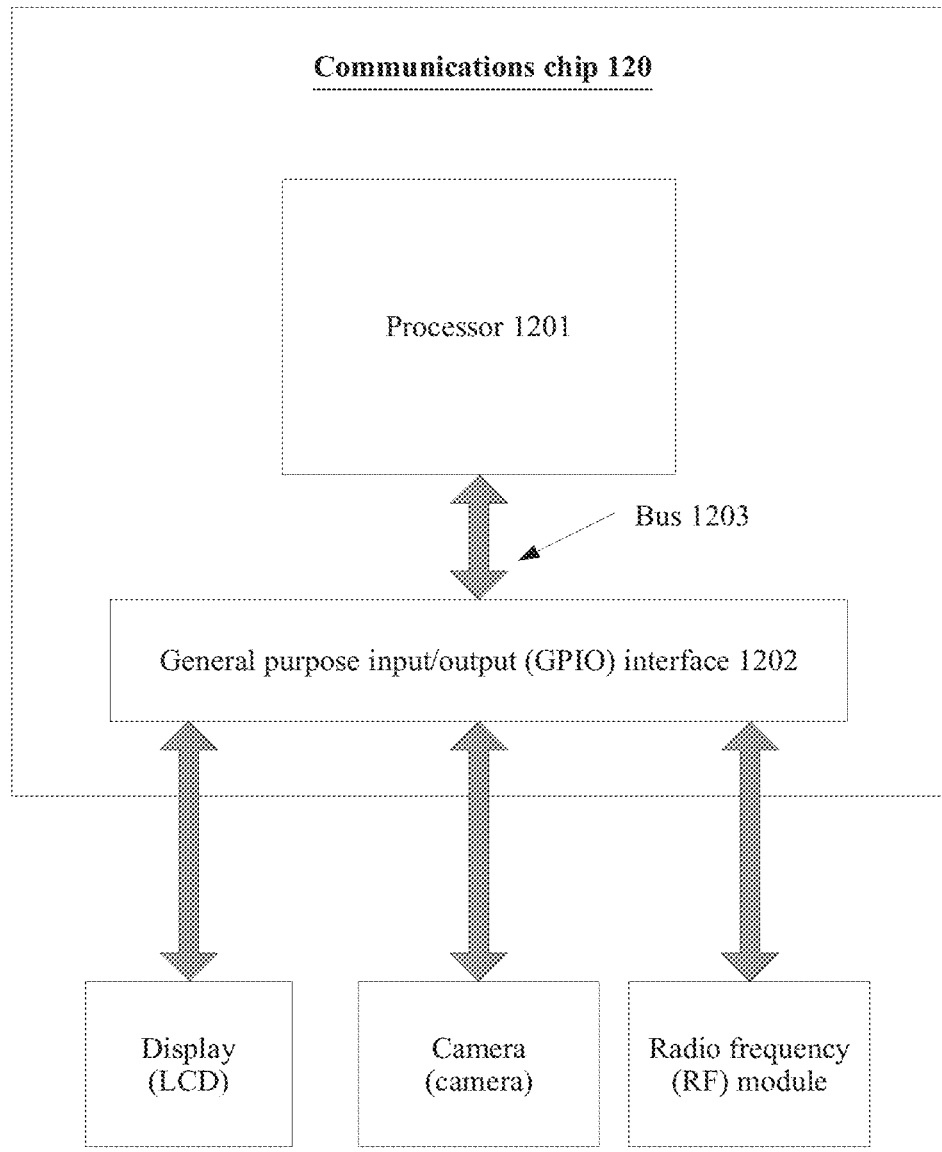
FIG. 12 is a schematic structural diagram of a communications chip according to an embodiment of the present invention.

FIG. 12 is a schematic structural diagram of a communications chip 120 according to this application. As shown in FIG. 12, the communications chip 120 may include a processor 1201 and one or more interfaces 1202 coupled to the processor 1201.

The processor 1201 may be configured to read and execute a computer-readable instruction. In a specific implementation, the processor 1201 may mainly include a controller, an arithmetic unit, and a register. The controller is mainly responsible for decoding an instruction, and sending a control signal for an operation corresponding to the instruction. The arithmetic unit is mainly responsible for performing a fixed-point or floating-point arithmetic operation, a shift operation, a logic operation, and the like; or may perform an address operation and an address conversion. The register is mainly responsible for storing a quantity of register operations, an intermediate operation result, and the like that are temporarily stored during instruction execution. In a specific implementation, a hardware architecture of the processor 1201 may be an application-specific integrated circuit (ASIC) architecture, an MIPS (Microprocessor without Interlocked Pipelined Stages) architecture, an ARM architecture, an NP architecture, or the like. The processor 1201 may be a single-core or multi-core processor.

The interface 1202 may be configured to input to-be-processed data to the processor 1201, and may output a processing result of the processor 1201. In a specific implementation, the interface 1202 may be a general purpose input/output (GPIO) interface, and may be connected to a plurality of peripheral devices (for example, a display (LCD), a camera, and a radio frequency (RF) module). The interface 1202 is connected to the processor 1201 through a bus 1203.

In this application, the processor 1201 may be configured to: invoke, from a memory, a program, on a network device side or a terminal device side, for implementing the subscription information configuration method according to one or more of the embodiments of this application, and execute an instruction included in the program. The interface 1202 may be configured to output an execution result of the processor 1201. In this application, the interface 1202 may be specifically configured to output a resource allocation result of the processor 1201. For the subscription information configuration method according to the one or more of the embodiments of this application, refer to the foregoing embodiments. Details are not described herein again.

It should be noted that functions corresponding to the processor 1201 and the interface 1202 may be implemented by using a hardware design, or may be implemented by using a software design, or may be implemented by combining software and hardware. This is not limited herein.

In this specification, the claims, and the accompanying drawings of this application, the terms "first", "second", "third", "fourth", and the like are intended to distinguish between different objects but do not indicate a particular order. In addition, the terms "including", "having", and any other variant thereof, are intended to cover non-exclusive inclusion. For example, a process, method, system, product, or device that includes a series of steps or units is not limited to the listed steps or units, but optionally further includes an unlisted step or unit, or optionally further includes another inherent step or unit of the process, method, product, or device.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of this application are generated. The computer may be a general purpose computer, a special purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, Solid State Disk (SSD)), or the like.

A person of ordinary skill in the art may understand that all or some of the processes of the methods in the embodiments may be implemented by a computer program instructing relevant hardware. The program may be stored in a computer-readable storage medium. When the program is run, the processes of the method embodiments are included. The storage medium may be a magnetic disk, a compact disc, a read-only memory (ROM), a random access memory (RAM), or the like.

In the foregoing specific implementations, the objectives, technical solutions, and benefits of the embodiments of the present invention are further described in detail. It should be understood that the foregoing descriptions are merely specific implementations of the embodiments of the present invention, but are not intended to limit the protection scope of the embodiments of present invention. Any modification, equivalent replacement, or improvement made based on the technical solutions of the embodiments of the present invention shall fall within the protection scope of the embodiments of the present invention.

What is claimed is:

1. A subscription information configuration method, comprising:
   receiving, by a network device, a first device identifier sent by a first terminal device in a first access mode;
   receiving, by the network device, a second device identifier sent by a second terminal device in a second access mode;
   determining, by the network device, whether the first device identifier matches the second device identifier;
   receiving, by the network device, a first random number sent by the first terminal device; and
   sending, by the network device, first verification information to the first terminal device, wherein the first verification information is generated based on the first random number and a first key; and
   in response to determining that the first device identifier matches the second device identifier, and that the network device receives first acknowledgment information from the first terminal device, sending, by the network device, subscription information of the first terminal device to the first terminal device in the first access mode, wherein the first acknowledgment information indicates that the first terminal device successfully verifies the first verification information.

2. The method according to claim 1, wherein before the sending, by the network device, subscription information of the first terminal device to the first terminal device in the first access mode, the method further comprises:
   sending, by the network device, a second random number to the first terminal device;
   receiving, by the network device, second verification information sent by the first terminal device, wherein the second verification information is generated by the first terminal device based on the second random number and a second key; and
   determining, by the network device, whether the second verification information matches third verification information, wherein the third verification information is generated by the network device based on the second random number and the first key; and
   wherein the sending, by the network device, subscription information of the first terminal device to the first terminal device in the first access mode comprises:
   in response to determining that the first device identifier matches the second device identifier, that the second verification information matches the third verification information, and that the network device receives the first acknowledgment information from the first terminal device, sending, by the network device, the subscription information of the first terminal device to the first terminal device in the first access mode.

3. The method according to claim 1, wherein before the sending, by the network device, subscription information of the first terminal device to the first terminal device in the first access mode, the method further comprises:
   receiving, by the network device, the first key sent by the second terminal device in the second access mode.

4. A subscription information configuration method, comprising:
   sending, by a first terminal device, a first device identifier to a network device in a first access mode;
   sending, by the first terminal device, a first random number to the network device;
   receiving, by the first terminal device, first verification information sent by the network device, wherein the first verification information is generated by the network device based on the first random number and a first key;
   generating, by the first terminal device, fourth verification information based on the first random number and a second key, wherein the second key is preconfigured in the first terminal device;
   determining, by the first terminal device, whether the first verification information matches the fourth verification information;
   in response to determining that the first verification information matches the fourth verification information, sending, by the first terminal device, first acknowledgment information to the network device, wherein the first acknowledgment information is used to indicate that the first terminal device successfully verifies the first verification information; and
   receiving, by the first terminal device, subscription information that is of the first terminal device and that is sent by the network device in the first access mode, wherein the subscription information is sent by the network device after the network device determines that the first device identifier matches a second device identifier, and wherein the second device identifier is sent by a second terminal device to the network device in a second access mode.

5. The method according to claim 4, wherein the first key is sent by the second terminal device to the network device in the second access mode.

6. The method according to claim 4, wherein before the receiving, by the first terminal device, subscription information that is of the first terminal device and that is sent by the network device in the first access mode, the method further comprises:

receiving, by the first terminal device, a second random number sent by the network device;

generating, by the first terminal device, second verification information based on the second random number and the second key, wherein the second key is preconfigured in the first terminal device; and sending, by the first terminal device, the second verification information to the network device, wherein the second verification information is used by the network device to verify the first terminal device.

7. A network device, comprising:

at least one processor; and a memory storing instructions executable by the at least one processor, wherein the instructions instruct the at least one processor to:

receive a first device identifier sent by a first terminal device in a first access mode;

receive a second device identifier sent by a second terminal device in a second access mode;

determine whether the first device identifier matches the second device identifier;

receive a first random number sent by the first terminal device;

send first verification information to the first terminal device, wherein the first verification information is generated based on the first random number and a first key; and in response to determining that the first device identifier matches the second device identifier and that the network device receives first acknowledgment information from the first terminal device, send subscription information of the first terminal device to the first terminal device in the first access mode, wherein the first acknowledgment information indicates that the first terminal device successfully verifies the first verification information.

8. The network device according to claim 7, wherein the instructions further instruct the at least one processor to:

before sending the subscription information of the first terminal device to the first terminal device in the first access mode, send a second random number to the first terminal device;

receive second verification information sent by the first terminal device, wherein the second verification information is generated by the first terminal device based on the second random number and a second key;

determine whether the second verification information matches third verification information, wherein the third verification information is generated by the network device based on the second random number and the first key; and wherein sending the subscription information of the first terminal device to the first terminal device in the first access mode comprises:

in response to determining that the first device identifier matches the second device identifier, that the second verification information matches the third verification information, and that the network device receives the first acknowledgment information from the first terminal device, sending the subscription information of the first terminal device to the first terminal device in the first access mode.

9. The network device according to claim 7, wherein the instructions further instruct the at least one processor to: before sending the subscription information of the first terminal device to the first terminal device in the first access mode, receive the first key sent by the second terminal device in the second access mode.

10. A terminal device, wherein the terminal device is a first terminal device, and wherein the first terminal device comprises:

at least one processor; and a memory storing instructions executable by the at least one processor, wherein the instructions instruct the at least one processor to:

send a first device identifier to a network device in a first access mode; and send a first random number to the network device;

receive first verification information sent by the network device, wherein the first verification information is generated by the network device based on the first random number and a first key;

generate fourth verification information based on the first random number and a second key, wherein the second key is preconfigured in the first terminal device;

determine whether the first verification information matches the fourth verification information;

in response to determining that the first verification information matches the fourth verification information, send first acknowledgment information to the network device, wherein the first acknowledgment information is used to indicate that the first terminal device successfully verifies the first verification information; and receive subscription information that is of the first terminal device and that is sent by the network device in the first access mode, wherein the subscription information is sent by the network device after the network device determines that the first device identifier matches a second device identifier, and wherein the second device identifier is sent by a second terminal device to the network device in a second access mode.

11. The terminal device according to claim 10, wherein the first key is sent by the second terminal device to the network device in the second access mode.

12. The terminal device according to claim 10, wherein the instructions further instruct the at least one processor to:

before receiving the subscription information that is of the first terminal device and that is sent by the network device in the first access mode, receive a second random number sent by the network device;

generate second verification information based on the second random number and the second key, wherein the second key is preconfigured in the first terminal device; and send the second verification information to the network device, wherein the second verification information is used by the network device to verify the first terminal device.

* * * * *